United States Patent
Su et al.

(10) Patent No.: US 12,028,450 B2
(45) Date of Patent: Jul. 2, 2024

(54) QUANTUM KEY RELAY METHOD BASED ON CENTRALIZED MANAGEMENT AND CONTROL NETWORK, AND APPARATUS

(71) Applicant: Huawei Technologies Co., Ltd., Shenzhen (CN)

(72) Inventors: Changzheng Su, Shenzhen (CN); Liangliang Lu, Shenzhen (CN); Su Hu, Shenzhen (CN); Xianlong Luo, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 16/402,525

(22) Filed: May 3, 2019

(65) Prior Publication Data

US 2019/0260581 A1    Aug. 22, 2019

Related U.S. Application Data

(63) Continuation of application No. PCT/CN2017/093389, filed on Jul. 18, 2017.

(30) Foreign Application Priority Data

Nov. 4, 2016  (CN) .......................... 201610967885.1

(51) Int. Cl.
*H04L 9/08*   (2006.01)
(52) U.S. Cl.
CPC .............. *H04L 9/0855* (2013.01); *H04L 9/08* (2013.01); *H04L 9/0838* (2013.01)
(58) Field of Classification Search
CPC ....... H04L 9/0855; H04L 9/0838; H04L 9/08; H04L 9/0852; H04L 29/06707; H04L 63/062; H04W 12/0401; H04W 12/04033
See application file for complete search history.

(56) References Cited

U.S. PATENT DOCUMENTS 6,895,091 B1 *  5/2005  Elliott ................... H04L 9/0852
                                                   380/278
7,068,790 B1 *  6/2006  Elliott ................... H04L 9/0852
                                                   380/256

(Continued)

FOREIGN PATENT DOCUMENTS

CN       102130769 A       7/2011
CN       103001875 A       3/2013

(Continued)

OTHER PUBLICATIONS

"Sasaki et al., Field test of quantum key distribution in the Tokyo QKD Network, 2011, Optical Society of America, pp. 1-22" (Year: 2011).*

(Continued)

*Primary Examiner* — Oleg Korsak
(74) *Attorney, Agent, or Firm* — Slater Matsil, LLP

(57) ABSTRACT

Embodiments of this application relate to the field of communications technologies. The embodiments of this application are applicable to a centralized management and control network. A centralized controller obtains Z service requests, globally determines, based on an identifier of a source service node and an identifier of a destination service node that are corresponding to each of the Z service requests, a quantum key consumption parameter, and topology information of key nodes in the centralized management and control network, globally optimal key relay instructions corresponding to G service requests, and further delivers the key relay instructions corresponding to the G service requests to key nodes corresponding to the key relay instructions, so that the key nodes perform quantum key relay based on the key relay instructions, to generate a shared quantum key between the source key node and the destination key node.

28 Claims, 9 Drawing Sheets

(56) References Cited

U.S. PATENT DOCUMENTS

| | | | | |
|---|---|---|---|---|
| 7,324,647 | B1* | 1/2008 | Elliott | H04B 10/70 370/390 |
| 7,392,378 | B1* | 6/2008 | Elliott | H04L 63/0428 380/277 |
| 7,430,295 | B1 | 9/2008 | Pearson et al. | |
| 7,512,242 | B2* | 3/2009 | Pearson | H04L 9/0855 380/278 |
| 7,646,873 | B2 | 1/2010 | Lee et al. | |
| 7,706,535 | B1* | 4/2010 | Pearson | H04L 9/0855 380/255 |
| 7,809,268 | B2 | 10/2010 | Meli et al. | |
| 8,204,231 | B2* | 6/2012 | Maeda | H04L 9/0891 380/279 |
| 8,639,932 | B2* | 1/2014 | Wiseman | H04L 9/0855 713/171 |
| 8,650,401 | B2* | 2/2014 | Wiseman | H04L 63/061 380/256 |
| 8,683,192 | B2* | 3/2014 | Ayling | H04B 10/70 713/153 |
| 9,692,595 | B2* | 6/2017 | Lowans | H04L 9/0852 |
| 10,356,064 | B1* | 7/2019 | Howard | H04W 12/08 |
| 10,382,198 | B2* | 8/2019 | Choi | H04L 9/0852 |
| 2003/0002674 | A1* | 1/2003 | Nambu | H04L 9/0852 380/256 |
| 2004/0184603 | A1* | 9/2004 | Pearson | H04L 9/0855 380/28 |
| 2004/0184615 | A1* | 9/2004 | Elliott | H04L 9/0852 380/283 |
| 2005/0078826 | A1* | 4/2005 | Takeuchi | H04L 9/0838 380/255 |
| 2005/0286723 | A1 | 12/2005 | Vig et al. | |
| 2006/0062392 | A1* | 3/2006 | Lee | H04L 9/0852 380/278 |
| 2008/0013738 | A1* | 1/2008 | Tajima | H04L 9/0852 380/278 |
| 2008/0137868 | A1* | 6/2008 | Sanders | H04L 9/0852 380/278 |
| 2008/0144836 | A1* | 6/2008 | Sanders | H04L 9/085 380/278 |
| 2008/0152147 | A1* | 6/2008 | Xia | H04L 9/0858 380/279 |
| 2009/0262942 | A1* | 10/2009 | Maeda | H04L 9/083 380/278 |
| 2009/0316910 | A1* | 12/2009 | Maeda | H04L 9/083 380/279 |
| 2010/0299526 | A1* | 11/2010 | Wiseman | H04L 63/061 713/171 |
| 2011/0213979 | A1* | 9/2011 | Wiseman | H04L 9/0844 713/171 |
| 2011/0228937 | A1* | 9/2011 | Wiseman | H04L 9/0855 380/255 |
| 2012/0177201 | A1* | 7/2012 | Ayling | H04L 9/0858 380/278 |
| 2012/0195428 | A1* | 8/2012 | Wellbrock | H04L 9/0855 380/255 |
| 2013/0051559 | A1* | 2/2013 | Baba | H04L 9/083 380/279 |
| 2013/0251145 | A1* | 9/2013 | Lowans | H04L 9/0858 380/44 |
| 2014/0023192 | A1* | 1/2014 | Tanizawa | H04L 9/0861 380/44 |
| 2014/0143443 | A1* | 5/2014 | Takahashi | H04L 45/38 709/241 |
| 2014/0289520 | A1* | 9/2014 | Tanizawa | H04L 45/14 713/168 |
| 2014/0331050 | A1* | 11/2014 | Armstrong | H04L 9/0819 713/171 |
| 2014/0365774 | A1* | 12/2014 | Tanizawa | H04L 9/0852 713/171 |
| 2014/0365786 | A1* | 12/2014 | Tanizawa | G06F 21/602 713/193 |
| 2015/0236852 | A1* | 8/2015 | Tanizawa | H04L 9/0858 380/278 |
| 2015/0270963 | A1* | 9/2015 | Tanizawa | H04L 9/0852 713/171 |
| 2016/0105439 | A1* | 4/2016 | Hunt | H04B 10/70 726/4 |
| 2016/0127127 | A1* | 5/2016 | Zhao | H04W 12/0401 713/171 |
| 2016/0226846 | A1* | 8/2016 | Fu | H04L 63/062 |
| 2016/0248581 | A1* | 8/2016 | Fu | H04L 9/0855 |
| 2016/0285629 | A1* | 9/2016 | Tanizawa | H04L 9/0852 |
| 2017/0214525 | A1* | 7/2017 | Zhao | H04W 12/0431 |
| 2017/0230173 | A1* | 8/2017 | Choi | H04L 9/12 |
| 2017/0264433 | A1* | 9/2017 | Tanizawa | H04L 9/0858 |
| 2019/0281034 | A1* | 9/2019 | Fu | H04L 9/0852 |

FOREIGN PATENT DOCUMENTS

| | | |
|---|---|---|
| CN | 104113407 A | 10/2014 |
| CN | 104243143 A | 12/2014 |
| CN | 104579964 A | 4/2015 |
| CN | 204258827 U | 4/2015 |
| CN | 105871538 A | 8/2016 |
| JP | 2013046363 A | 3/2013 |
| JP | 2014022898 A | 2/2014 |
| JP | 2014103514 A | 6/2014 |
| JP | 2015179974 A | 10/2015 |
| JP | 2016521935 A | 7/2016 |
| KR | 20160050912 A | 5/2016 |

OTHER PUBLICATIONS

Alléaume et al. Using quantum key distribution for cryptographic purposes, Theoretical Computer Science 560 (2014) 62-81 (Year: 2014).*

Broadbent et al. Quantum cryptography beyond quantum key distribution, Des. Codes Cryptogr. (2016) 78:351-382 (Year: 2016).*

Sasaki, M, et al. "Field test of quantum key distribution in the Tokyo QKD Network." Optics express, vol. 19, pp. 10387-10409 (2011.).

Aguado A et al., "Quantum-Aware Software Defined Networks", University of Bristol—Explore Bristol Research, Sep. 12-16, 2016, 4 pages.

Aguado, A. et al., "First Experimental Demonstration of Secure NFV Orchestration over an SDN-Controlled Optical Network with Time-Shared Quantum Key Distribution Resources", Sep. 18-22, 2016, 3 pages, 42nd European Conference and Exhibition on Optical Communications, Dusseldorf.

Wikipedia, IPv4; https://en.wikipedia.org/w/index.php?title=IPv4andoldid=171033624, Dec. 24, 2020, 13 pages.

Tanizawa, Y. et. al. "A routing method designed for a quantum key distribution network." Eighth International Conference on Ubiquitous and Future Networks, (ICUFN), IEEE, Sep. 2016, 7 pages.

Wang, S. et al, "Field test of wavelength-saving quantum key distribution network", Optics Letters / vol. 35, No. 14 / Jul. 15, 2010, 3 pages.

* cited by examiner

QUANTUM KEY RELAY METHOD BASED ON CENTRALIZED MANAGEMENT AND CONTROL NETWORK, AND APPARATUS

CROSS-REFERENCE TO RELATED APPLICATIONS

This application is a continuation of International Application No. PCT/CN2017/093389, filed on Jul. 18, 2017, which claims priority to Chinese Patent Application No. 201610967885.1, filed on Nov. 4, 2016. The disclosures of the aforementioned applications are hereby incorporated by reference in their entireties.

TECHNICAL FIELD

This application relates to the field of secure communication, and in particular, to a quantum key relay method based on a centralized management and control network, and an apparatus.

BACKGROUND

Quantum cryptography is an interdisciplinary product of quantum mechanics and cryptology, and security of the quantum cryptography is ensured based on a principle of quantum mechanics. Any operation for attempting to intercept or measure a quantum key causes a quantum state to change. A receive end can determine, based on a quantum state change, whether there is an eavesdropper in a communication process, to determine whether to discard a current key, thereby unconditionally ensuring communication security.

A quantum key network node usually includes a classical communications terminal connected to a classical communications network and a quantum device terminal connected to a quantum key distribution (QKD) network. In classical communication, an amplifier is used to resolve a channel loss problem. However, because a quantum signal cannot be cloned, a relay process of "regeneration and amplification" in the classical communication cannot be directly used in quantum communication. In addition, in a transmission process, channel attenuation increases as a distance increases. When a distance between a transmit end and the receive end is greater than an effective transmission distance, an average photon quantity at the receive end is rather small. When the average photon quantity is almost equal to a dark count of a single-photon detector, basically no secure key can be generated any longer. Therefore, an effective transmission distance of quantum key distribution is limited. Based on the limited effective transmission distance and limited network construction costs, no direct quantum links exist between many terminals, and quantum key sharing of the terminals requires forwarding performed by a relay node.

FIG. 1 shows an example of a schematic diagram of a quantum key transmission model based on trusted relay in the prior art. As shown in FIG. 1, quantum communication needs to be performed between a transmit end node (Alice) and a receive end node (Bob), and a key negotiation path between the transmit end node and the receive end node includes a total of three relay nodes: a relay node 1, a relay node 2, and a relay node 3.

A key distribution link is established between Alice and the trusted relay node 1, to perform quantum key negotiation and generate a key K1. A key distribution link is established between the relay node 1 and the relay node 2, to perform quantum key negotiation and generate a shared key K2. A key distribution link is established between the relay node 2 and the relay node 3, to perform quantum key negotiation and generate a shared key K3. A key distribution link is established between the relay node 3 and Bob, to perform quantum key negotiation and generate a shared key K4.

The relay node 1 encrypts the key K1 by using K2 and then transmits the encrypted K1 to the trusted relay node 2. Then, the relay node 2 decrypts, by using K2, the received K1 encrypted by using K2, to obtain K1, encrypts K1 by using K3, and transmits the encrypted K1 to the trusted relay node 3. Next, the relay node 3 decrypts, by using K3, the received K1 encrypted by using K3, to obtain K1, encrypts K1 by using K4, and transmits the encrypted K1 to Bob. Finally, Bob receives K1 encrypted by using the key K4 and decrypts K1 by using K4, to obtain K1. In this way, quantum communication can be performed between Alice and Bob by using the key K1. The relay nodes, the transmit end node (Alice), and the receive end node (Bob) may also be referred to as key nodes. In FIG. 1, T represents a transmit interface, for example, interfaces T1, T2, T3, and T4 in FIG. 1; and R represents a receive interface, for example, interfaces R1, R2, R3, and R4 in FIG. 1.

SUMMARY

Embodiments of this application provide a quantum key relay method based on a centralized management and control network, and an apparatus, to determine a globally optimal key relay instruction, so that a source key node and a destination key node perform quantum key relay based on the globally optimal key relay instruction.

According to a first aspect, an embodiment of this application provides a quantum key relay method based on a centralized management and control network, applicable to a centralized management and control network. The centralized management and control network includes a centralized controller, N service nodes, and M key nodes, and both N and M are integers greater than or equal to 2. The method includes: obtaining, by the centralized controller, Z service requests, where Z is an integer greater than or equal to 1; determining, by the centralized controller based on each of the Z service requests, an identifier of a source service node and an identifier of a destination service node that are corresponding to each service request, and a quantum key consumption parameter of the service request, where the source service node is corresponding to a source key node, and the destination service node is corresponding to a destination key node; determining, by the centralized controller based on the identifier of the source service node and the identifier of the destination service node that are corresponding to each of the Z service requests, the quantum key consumption parameter, and topology information of the key nodes in the centralized management and control network, key relay instructions corresponding to G service requests, where G is an integer less than or equal to Z and greater than or equal to 1; and delivering, by the centralized controller, the key relay instructions corresponding to the G service requests to key nodes corresponding to the key relay instructions, so that the key nodes perform quantum key relay based on the key relay instructions, to generate a shared quantum key between the source key node and the destination key node.

According to a second aspect, an embodiment of this application provides a quantum key relay method based on a centralized management and control network, applicable to a centralized management and control network. The centralized management and control network includes a centralized controller, N service nodes, and M key nodes, and both N and M are integers greater than or equal to 2. For one of the M key nodes, the method includes: reporting, by the key node, topology information of the key node to the centralized controller; receiving, by the key node, a key relay instruction delivered by the centralized controller; and performing, by the key node, quantum key relay based on the key relay instruction delivered by the centralized controller, where the key relay instruction is used to indicate any one or more of the following content: the key node determines, as a quantum key shared by the key node and a destination key node, a determined first target quantum key shared by the key node and a next-hop key node of the key node; the key node determines a second target quantum key shared by the key node and a previous-hop key node of the key node, encrypts the second target quantum key by using a first encryption and decryption quantum key shared by the key node and a next-hop key node of the key node, and transmits the obtained encrypted second target quantum key to the next-hop key node of the key node; the key node determines a second encryption and decryption quantum key shared by the key node and a previous-hop key node of the key node, decrypts an obtained encrypted third target quantum key by using the second encryption and decryption quantum key, encrypts the third target quantum key by using a third encryption and decryption quantum key shared by the key node and a next-hop key node of the key node, and transmits the obtained encrypted third target quantum key to the next-hop key node of the key node; and the key node determines a fourth encryption and decryption quantum key shared by the key node and a previous-hop key node of the key node, and decrypts an obtained encrypted fourth target quantum key by using the fourth encryption and decryption quantum key, to obtain a target quantum key.

According to a third aspect, a centralized controller is provided, including a processor and a memory. The memory is configured to store a computer program, and the processor is configured to invoke the computer program from the memory and run the computer program, so that the centralized controller performs the method in any possible implementation of the first aspect.

According to a fourth aspect, a key node is provided, including a processor and a memory. The memory is configured to store a computer program, and the processor is configured to invoke the computer program from the memory and run the computer program, so that the key node performs the method in any possible implementation of the second aspect.

According to a fifth aspect, a centralized controller is provided, including each unit or module that can be configured to perform the quantum key relay method in any possible implementation of the first aspect. In an optional solution, the centralized controller includes a storage unit, a processing unit, and a transceiver unit.

According to a sixth aspect, a key node is provided, including each unit or module that can be configured to perform the communication method in any possible implementation of the second aspect. In an optional solution, the key node includes a key pool, a transceiver unit, and a key relay unit.

According to a seventh aspect, a system is provided, and the system includes the foregoing centralized controller and key node.

According to an eighth aspect, a computer program product is provided, and the computer program product includes a computer program (which may also be referred to as code or an instruction). When the computer program runs, a computer is enabled to perform the method in any possible implementation of the first aspect, or a computer is enabled to perform the method in any possible implementation of the second aspect.

According to a ninth aspect, a computer-readable medium is provided, and the computer-readable medium stores a computer program (which may also be referred to as code or an instruction). When the computer program runs on a computer, the computer is enabled to perform the method in any possible implementation of the first aspect, or the computer is enabled to perform the method in any possible implementation of the second aspect.

DETAILED DESCRIPTION OF ILLUSTRATIVE EMBODIMENTS

Figure 1:
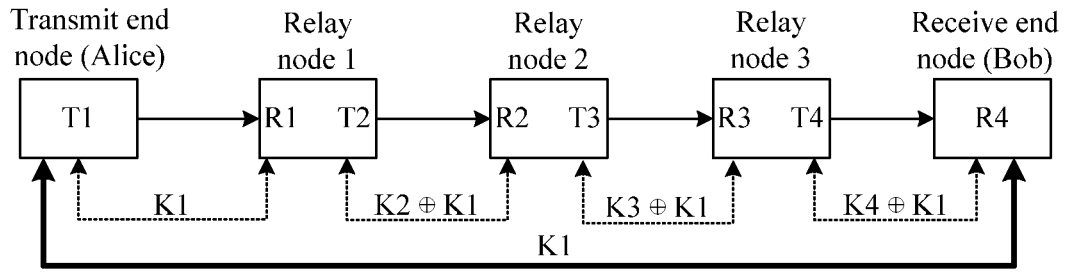
FIG. 1 is a schematic diagram of a quantum key transmission model based on trusted relay in the background.

In the solutions provided in the embodiments of this application, a centralized management and control network is used. Optionally, the centralized management and control network is a software defined network (SDN). The SDN is a new network architecture. A design concept of the SDN is to separate a control plane of the network from a data forwarding plane, so as to control underlying hardware in a programmable manner by using a software platform on a centralized controller, and flexibly schedule and distribute network resources depending on requirements.

In the SDN network, a network device is only responsible for data forwarding, and may use commodity hardware; and an operating system that is originally responsible for control is promoted to an independent network operating system, and is responsible for adapting to different service features. In addition, communication among the network operating system, the service feature, and the hardware device may be implemented through programming. Compared with a conventional network, the SDN network has the following basic features.

First, separation between control and forwarding. A forwarding plane includes a controlled forwarding device, and a forwarding manner and service logic are controlled by a control application that runs on a control plane that is separated from the forwarding plane.

Second, an open interface between a control plane and a forwarding plane. The SDN network provides an open programmable interface for the control plane. In this manner, a control application only needs to focus on logic of the control application, and does not need to focus on more underlying implementation details.

Third, centralized control in logic. A logically centralized control plane can control a plurality of forwarding plane devices, that is, control an entire physical network, so that a global network status view can be obtained, and optimized control can be implemented for the network based on the global network status view.

The SDN network mainly includes three functional units: an application unit, including various different services and applications; a control unit, mainly responsible for orchestrating data plane resources, maintaining a network topology and status information, and the like; and an infrastructure unit, responsible for data processing and forwarding and status collection based on a flow table. The SDN network essentially has three features: "separation between control and forwarding", "device resource virtualization", and "programmable commodity hardware and software". The SDN network can normalize device hardware. The hardware focuses on only forwarding and storage capabilities, is decoupled from a service feature, and may be implemented by using a relatively inexpensive commercially available architecture. In the SDN network, intelligence of the network is implemented by software only, a type and a function of a network device depend on software configuration, and network operation control and running are completed by a server that is used as a network operating system. The SDN network responds to a service more quickly, and various services are flexibly added or deleted and customized, so that various network parameters can be customized and configured in the network in real time, and a time for opening a specific service is shortened.

In addition to the SDN network mentioned in the foregoing content, the centralized management and control network may be another same or similar network, for example, a transport network, a router network, an access network, or a wireless network that is based on a unified network management and control system. The centralized controller in the embodiments of this application is an apparatus in the centralized management and control network, for example, may be an SDN controller in the SDN network, or may be a network management server in the transport network, the router network, the access network, or the wireless network.

Figure 2:
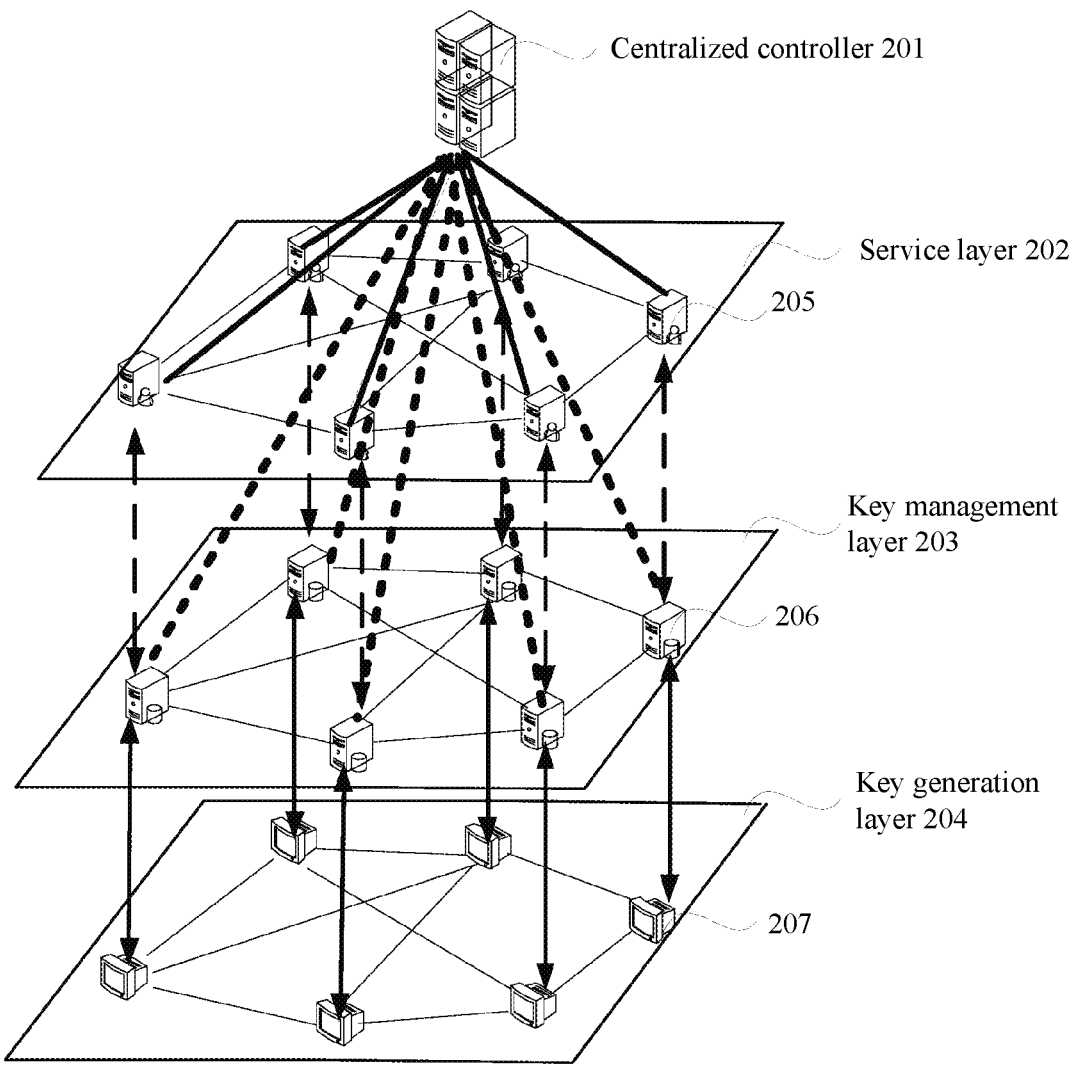
FIG. 2 is a schematic architectural diagram of a system according to an embodiment of this application.

FIG. 2 is a schematic architectural diagram of a system to which an embodiment of this application is applied. As shown in FIG. 2, the system may include a centralized controller 201 and a centralized management and control network, and the centralized management and control network includes a service layer 202, a key management layer 203, and a key generation layer 204. The service layer 202 includes a plurality of service nodes 205, the key management layer 203 includes a plurality of key management nodes 206, and the key generation layer 204 includes a plurality of key generation nodes 207. In FIG. 2, the service layer, the key management layer, the key generation layer, and the corresponding service node, key management node, and key generation node are obtained through logical definition and division. Actually, the service node, the key management node, and the key generation node may be different functional components that are integrated into one device, or the service node may be one device, and the key management node and the key generation node are integrated into another device.

The plurality of key management nodes included at the key management layer 203 may be linked to each other, to relay a quantum key. The plurality of key generation nodes included at the key generation layer 204 may be linked to each other, to generate a quantum key. The key management nodes 206 at the key management layer 203 are in a one-to-one correspondence with the key generation nodes 207 at the key generation layer 204. In other words, one key management node is corresponding to one key generation node. A key node in this embodiment of this application includes a key management node and a key generation node corresponding to the key management node. The key generation node in FIG. 2 may generate symmetric keys by using a quantum key distribution mechanism, or by using another method such as a diffie-hellman (DH) algorithm. Optionally, work of generating a key by the key node is completed by the key generation node, and other work performed by the key node is completed by the key management node.

The service layer 202 may include a plurality of service nodes. The plurality of service nodes is linked to each other, to transmit a service between the service nodes. The service node may be a node that requires secure communication, or may be a node that does not require secure communication. The service node that does not require secure communication may not be corresponding to a key node, but each service node that requires secure communication is corresponding to a key node. This embodiment of this application focuses on description of a secure communication solution, and therefore all the service nodes described in this embodiment of this application are service nodes that require secure communication. Optionally, a quantity of service nodes may be less than a quantity of key nodes. To be specific, one service node is corresponding to one key node, but there is also a key node that does not need to be corresponding to a service node.

As shown in FIG. 2, a key generation node is linked to a key management node corresponding to the key generation node, so that the key management node relays a quantum key generated by the key generation node. The key management node is linked to a service node corresponding to the key management node, so that the service node performs encryption and decryption by using quantum key service information obtained through cooperation between the key management node and the key generation node, to implement secure communication. The centralized controller is linked to each service node and is configured to obtain information such as a service request reported by each service node. The centralized controller is linked to all key nodes in the centralized management and control network and is configured to obtain topology information of the key nodes reported by the key nodes.

Figure 3:
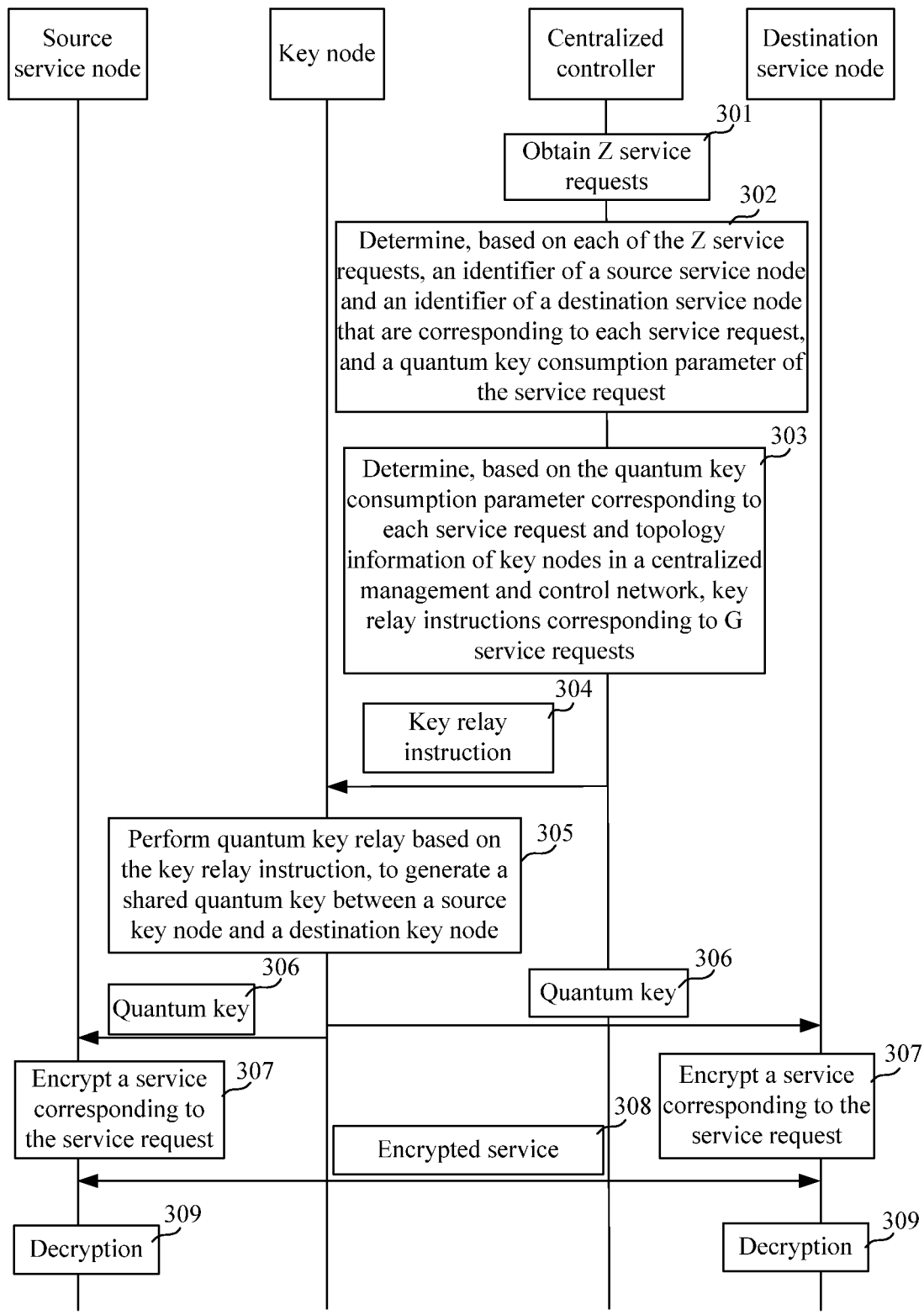
FIG. 3 shows a quantum key relay method based on a centralized management and control network according to an embodiment of this application.

FIG. 3 shows an example of a quantum key relay method based on a centralized management and control network according to an embodiment of this application. The quantum key relay method is applicable to a centralized management and control network. The centralized management and control network includes a centralized controller, N service nodes, and M key nodes. One service node is corresponding to one key node, and both N and M are integers greater than or equal to 2. The method includes the following steps.

Step 301: The centralized controller obtains Z service requests, where Z is an integer greater than or equal to 1.

Step 302: The centralized controller determines, based on each of the Z service requests, an identifier of a source service node and an identifier of a destination service node that are corresponding to each service request, and a quantum key consumption parameter of the service request, where the source service node is corresponding to a source key node, the destination service node is corresponding to a destination key node, and the source service node and the destination service node are two of the N service nodes in the centralized management and control network. Optionally, the Z service requests include Z source service nodes and Z destination service nodes, the Z source service nodes include at least two different source service nodes, and/or the Z destination service nodes include at least two different destination service nodes.

Step 303: The centralized controller determines, based on the identifier of the source service node and the identifier of the destination service node that are corresponding to each of the Z service requests, the quantum key consumption parameter, and topology information of the key nodes in the centralized management and control network, key relay instructions corresponding to G service requests, where G is an integer less than or equal to Z and greater than or equal to 1. Optionally, the key node reports the topology information of the key nodes to the centralized controller before step 303.

Step 304: The centralized controller delivers the key relay instructions corresponding to the G service requests to key nodes corresponding to the key relay instructions, so that the key nodes perform quantum key relay based on the key relay instructions, to generate a shared quantum key between the source key node and the destination key node.

Optionally, after step 304, step 305 may be performed as described in the following. The key nodes receive the key relay instructions delivered by the centralized controller, and perform quantum key relay based on the key relay instructions, to generate the shared quantum key between the source key node and the destination key node. Optionally, the shared quantum key between the source key node and the destination key node may be generated by the source key node, and is transmitted to the destination key node based on the key relay instruction; or may be generated by the destination key node, and is transmitted to the source key node based on the key relay instruction. The shared quantum key generated between the source key node and the destination key node is stored on both the source key node and the destination key node. Optionally, the key relay instruction is determined by the centralized controller based on the identifier of the source service node and the identifier of the destination service node that are corresponding to each of the Z service requests, the quantum key consumption parameter, and the topology information of the key nodes in the centralized management and control network after obtaining the Z service requests.

Optionally, after step 305, step 306 may be performed as described in the following. The source service node obtains a quantum key from the source key node, and the destination service node obtains a quantum key from the destination key node.

Optionally, after step 306, step 307 may be performed as described in the following. The source service node encrypts, by using the quantum key shared by the source key node and the destination key node, a service corresponding to the service request. Optionally, the destination service node encrypts, by using the quantum key shared by the source key node and the destination key node, the service corresponding to the service request. Optionally, after step 306 and before step 307, the source service node obtains, from the source key node, the quantum key shared by the source key node and the destination key node. The destination service node obtains, from the destination key node, the quantum key shared by the source key node and the destination key node. Optionally, the source service node and the destination service node in this embodiment of this application each are one of the service nodes.

Optionally, after step 307, step 308 may be performed as described in the following. The source service node sends the service encrypted by using the quantum key to the destination service node. Optionally, the destination service node sends the service encrypted by using the quantum key to the source service node.

Optionally, after step 308, step 309 may be performed as described in the following. The destination service node performs decryption by using the quantum key that is shared by the source key node and the destination key node and that is obtained from the destination key node, to obtain the service corresponding to the service request. Optionally, the source service node performs decryption by using the quantum key that is shared by the source key node and the destination key node and that is obtained from the source key node, to obtain the service corresponding to the service request.

In this embodiment of this application, the key node is added to the centralized management and control network, to construct a new quantum key distribution network, implement centralized control over the quantum key and services by using the centralized management and control network, implement multi-layer multi-domain collaboration and global optimization in the quantum key distribution network, achieve environmental friendliness and energy conservation, reduce device hardware costs, and the like. In addition, because in the solution provided in this embodiment of this application, quantum key relay and the centralized management and control network are combined, based on features such as separation between control and forwarding of the centralized management and control network and implementation of centralized control, key relay instructions of all service requests can be efficiently and uniformly analyzed and calculated, and the key relay instructions are globally determined based on the topology information of all the key nodes in the entire centralized management and control network, so that a key relay instruction corresponding to each service request is globally optimal, and current and future key requirements can be met to a maximum extent.

Second, because in this embodiment of this application, the centralized controller efficiently and uniformly analyzes and calculates the key relay instructions of all the service requests, to be specific, the centralized controller may consider that there are simultaneously Z service requests, the centralized controller may consider the Z service requests concurrently, and allocate, to the utmost, appropriate key relay instructions that do not conflict with each other to all the G service requests.

Third, because algorithms of all the key relay instructions are located on the centralized controller, the centralized controller delivers the key relay instructions to the key nodes after determining the key relay instructions, and the key nodes may only need to perform quantum key relay based on the received key relay instructions. In this way, a computing resource requirement of the key node is significantly reduced, thereby simplifying a function of the key node, and reducing complexity and costs of the key node.

Fourth, because the topology information of all the key nodes in the centralized management and control network is stored on the centralized controller and does not need to be stored on each key node, when information about a key node is stolen, the topology information of the key nodes in the entire centralized management and control network is not stolen, so that security of the entire centralized management and control network is enhanced.

Fifth, because the centralized controller in this embodiment of this application may determine the key relay instructions based on the quantum key consumption parameter and the topology information of the key nodes in the centralized management and control network, the centralized controller can determine one or more paths to meet a service request requirement.

Sixth, because quantum key relay and the centralized management and control network are combined in this embodiment of this application, a network scale can be flexibly expanded based on the centralized management and control network, and a service node and/or a key node can be flexibly added to the centralized management and control network, to implement centralized and automatic network management and the like.

In this embodiment of this application, the centralized controller may collect information about a service layer, a key management layer, and a key generation layer, and manage the service node and the key node. In this embodiment of this application, the centralized controller is described by using the following implementation a1, implementation a2, implementation a3, and implementation a4 as examples.

Implementation a1

Optionally, the topology information of the key nodes in the centralized management and control network includes at least an identifier of each key node and a status of a quantum link between each key node and one or more other key nodes. The status of the quantum link may include a status of a link between a key node and another key node, for example, there is a link between two key nodes, or there is no link between two key nodes; and may further be used to indicate whether the link between the key node and the another key node is in a normal working state or an abnormal state.

Adding one key node to the service layer does not need to be limited by dedicated hardware. The newly added key node may determine whether a quantum link between the key node and a neighboring key node is in a normal working state or an abnormal state; and if the link is in a normal working state, report related information of the newly added key node to the centralized controller, to add the related information to the centralized management and control network. The related information, reported to the centralized controller, of the newly added key node may be an identifier of the newly added key node, a status of a quantum link between the newly added key node and another key node, or the like.

If a quantum link between a key node and a neighboring key node is in an abnormal state, the key node may report an abnormal state of the neighboring key node of the key node to the centralized controller. The centralized controller sends a detection signal to the neighboring key node based on received information about the abnormal state of the key node. If the centralized controller does not receive, within predetermined duration, a response signal sent by the neighboring key node, the centralized controller determines that the neighboring key node is unavailable, and deletes information about the neighboring key node from the centralized management and control network.

It can be learned that in the centralized management and control network, the centralized controller can flexibly add and delete a key node, so as to flexibly expand a network scale, and support innovation of various new network system architectures and new services in the future. This has higher deployment feasibility than distributed control. A service node can be added and deleted by using a method similar to the foregoing method, so that the network scale is flexibly expanded. The method is similar to the method for adding and deleting a key node and determining an exception, and details are not described herein again.

Implementation a2

Optionally, the centralized controller may identify a user of each service node in the centralized management and control network. Optionally, all service nodes in each area may be further corresponding to a group identifier, and different group identifiers are used for different areas to facilitate management. For example, the group identifier of the service nodes may be similar to an area code of a telephone number. When making a service request for using a quantum key, the user needs to provide an identifier of a service node of the user and an identifier of a service node of a receive end for the centralized controller.

Correspondingly, optionally, the centralized controller may identify a user of each key node in the centralized management and control network. Optionally, all key nodes in each area may be further corresponding to a group identifier, and different group identifiers are used for different areas to facilitate management. For example, the group identifier of the key nodes may be similar to an area code of a telephone number. When making a service request for using a quantum key, the user needs to provide an identifier of a key node of the user and an identifier of a key node of a receive end for the centralized controller.

Implementation a3

Optionally, after obtaining a service request, the centralized controller may determine, based on user permission corresponding to the source service node and/or the destination service node, whether to provide a quantum key for the service request. If the source service node has permission to obtain a quantum key, a quantum key is provided for the service request. If the source service node has no permission to obtain a quantum key, the service request is directly rejected.

Optionally, when a user makes a service request for using a quantum key, the service request includes an identifier of a source service node, an identifier of a destination service node, and a quantum key consumption parameter of the service request. Optionally, information such as a quantity of opened services, priorities of the services, and whether a service that needs to be opened is a common service may be further provided.

Optionally, in the foregoing step 301 in this embodiment of this application, the centralized controller obtains the Z service requests. Specifically, there is a plurality of possible manners. In this embodiment of this application, the following several manners are described as examples.

In a first possible manner, the source service node reports the service request to the centralized controller. Optionally, the service request includes the identifier of the destination service node and the quantum key consumption parameter of the service request. Because the source service node reports the service request to the centralized controller, the centralized controller may determine the identifier of the source service node, and further the centralized controller may determine the identifier of the destination service node and the quantum key consumption parameter of the service request based on content included in the service request.

In a second possible manner, the destination service node reports the service request to the centralized controller. Optionally, the service request includes the identifier of the source service node and the quantum key consumption parameter of the service request. Because the destination service node reports the service request to the centralized controller, the centralized controller may determine the identifier of the destination service node, and further the centralized controller may determine the identifier of the source service node and the quantum key consumption parameter of the service request based on content included in the service request.

In a third possible manner, the centralized controller initiates the service request between the source service node and the destination service node at predetermined time according to a preset rule. Optionally, the preset rule may include the identifier of the source service node, the identifier of the destination service node, and information about the quantum key consumption parameter of the service request.

In a fourth possible manner, an operator or a third-party program directly configures the centralized controller to initiate the service request between the source service node and the destination service node at predetermined time.

Implementation a4

Before step 304, a possible implementation is that the centralized controller periodically obtains topology information, reported by the key nodes in the centralized management and control network, of the key nodes. Another possible implementation is that the key nodes periodically report topology information of the key nodes to the centralized controller. In this way, the centralized controller can control latest topology information of the key nodes at any time, to provide a more accurate and appropriate key relay path.

Optionally, the topology information of the key nodes in the centralized management and control network includes at least an identifier of each key node, a status of a quantum link between each key node and one or more other key nodes, and an edge weight of any two adjacent key nodes.

Figure 3A:
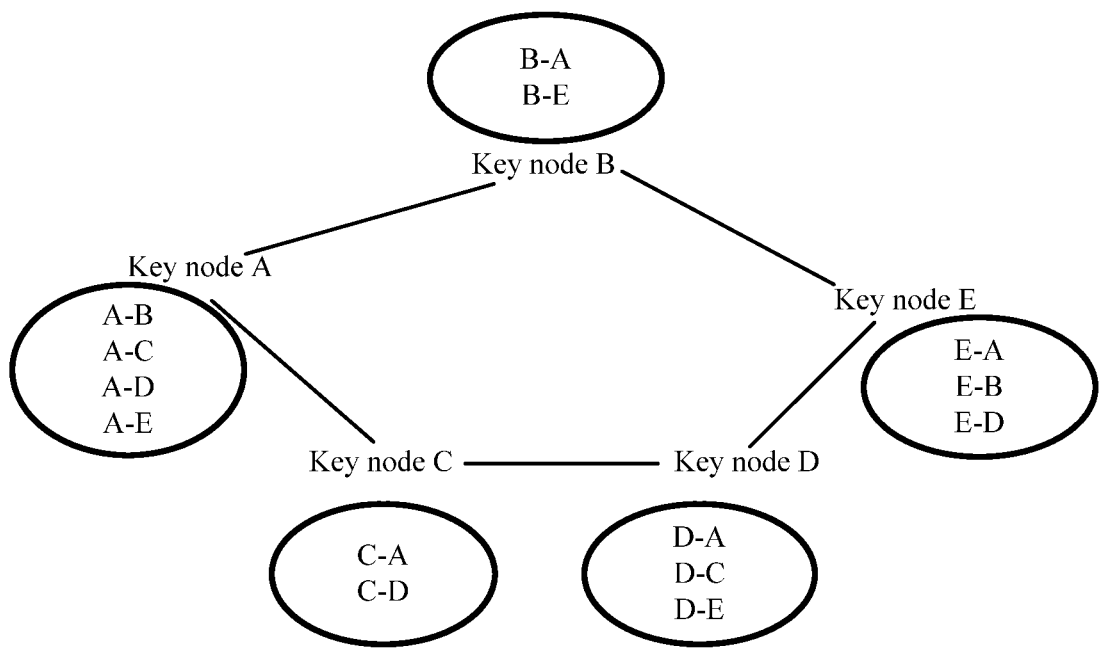
FIG. 3a is a schematic diagram of a key node connection architecture in a centralized management and control network according to an embodiment of this application.

Optionally, some quantum keys are pre-stored between any two key nodes. FIG. 3a is an example of a schematic diagram of a key node connection architecture in a centralized management and control network according to an embodiment of this application. As shown in FIG. 3a, a key node A, a key node B, a key node E, a key node D, a key node C, and the key node A are successively connected. Each key node stores a quantum key shared by the key node and another key node. For example, in FIG. 3a, the key node A pre-stores a quantum key shared by the key node A and the key node B, a quantum key shared by the key node A and the key node C, a quantum key shared by the key node A and the key node D, and a quantum key shared by the key node A and the key node E. For another example, the key node C pre-stores a quantum key shared by the key node C and the key node A and a quantum key shared by the key node C and the key node D.

Optionally, a shared quantum key may be stored between two key nodes corresponding to two service nodes that frequently perform service transmission. In this way, when a quantum key needs to be consumed for service transmission between the two service nodes, the inventory quantum key between the key nodes corresponding to the two service nodes may be directly used, and a quantum key shared by the key nodes corresponding to the two service nodes does not need to be re-generated, so that a key providing response speed is increased.

In this embodiment of this application, as shown in FIG. 3a, the key node A, the key node B, the key node E, the key node D, the key node C, and the key node A are successively connected physically. The key node A and the key node B may be referred to as two adjacent key nodes, the key node B and the key node E may be referred to as two adjacent key nodes, the key node E and the key node D may be referred to as two adjacent key nodes, the key node D and the key node C may be referred to as two adjacent key nodes, and the key node C and the key node A may be referred to as two adjacent key nodes.

In addition, in this embodiment of this application, the foregoing two quantum key nodes that are physically in a link connection relationship are referred to as two adjacent key nodes, and besides, two key nodes that store a shared quantum key are also referred to as two adjacent key nodes. For example, as shown in FIG. 3a, a shared quantum key is stored between the key node A and the key node E, and therefore the key node A and the key node E may be referred to as two adjacent key nodes. For another example, a shared quantum key is stored between the key node A and the key node D, and therefore the key node A and the key node D may be referred to as two adjacent key nodes. In other words, although some key nodes, for example, the key node A and the key node E, are physically not adjacent in this embodiment of this application, such two key nodes are also referred to as two adjacent key nodes in this embodiment of this application because the two key nodes have a shared quantum key.

Two key nodes separately store a quantum key shared by the two key nodes, a shared key pool is created on the key nodes, and quantum keys are pre-stored in the key pool. When there is a service request, a large quantity of keys can be provided rapidly. When there is no service request, the key pool may be supplemented until the key pool is full. Optionally, a key is not allowed to enter the key pool again after being discharged from the key pool. During storage, quantum keys may be stored to the key pool of key nodes in a data queue form, and a quantum key that is first generated enters the key pool first, and is also first extracted when the quantum key needs to be used.

Optionally, if the key node receives a plurality of key relay instructions, when quantum keys need to be simultaneously extracted from the shared key pool based on the plurality of key relay instructions, the quantum keys may be successively extracted from the key pool based on sorting of the plurality of key relay instructions. Optionally, the plurality of key relay instructions may be sorted on the centralized controller, or may be sorted on the key node. In this way, when two key nodes extract a quantum key based on two key relay instructions in a same service request, a same shared quantum key can be extracted from the shared key pool.

The key node may further create a plurality of point-to-point quantum key distribution systems concurrently, and the systems can work simultaneously, so that a quantum key storage rate can be increased. For example, a shared quantum key is generated and stored between the key node A and the key node B, and a shared quantum key may be generated and stored between the key node A and the key node C. A quantum key distribution system of the key node A and the key node B and a quantum key distribution system of the key node A and the key node C are independent of each other and can work simultaneously, so that the quantum key storage rate is increased.

In a specific implementation, optionally, after determining the topology information of the key nodes, when determining a quantity of inventory quantum keys between key nodes is less than a quantity threshold of inventory quantum keys between the key nodes, the centralized controller may deliver an instruction to relay a quantum key between the two key nodes, generate a shared quantum key between the two key nodes, and add the shared quantum key to the key pool, to increase the quantity of inventory quantum keys between the two key nodes.

After obtaining the service request, the centralized controller needs to determine whether a quantum key relay operation needs to be performed. Optionally, specific determining may be performed based on different key consumption parameters. Optionally, the quantum key consumption parameter includes a total key consumption quantity K. Optionally, the quantum key consumption parameter includes a total key consumption quantity K and service duration t. Optionally, the quantum key consumption parameter includes a service's key consumption speed V. Therefore, the centralized controller can more accurately determine a key relay path based on the specific key consumption parameter, and better provide a quantum key for a service corresponding to the service request. The following provides descriptions by using several possible cases as examples.

In a case 1, if the quantum key consumption parameter includes the total key consumption quantity K and the service duration t, or includes only the total key consumption quantity K, the centralized controller obtains a quantity P of inventory quantum keys between the source key node and the destination key node. When determining that the total key consumption quantity K is not greater than the quantity P of inventory keys, the centralized controller determines that the key relay operation does not need to be performed. In this way, the quantum key shared by the source key node and the destination key node can be directly obtained from the key node, so as to implement a service encryption and decryption process.

In a case 2, if the quantum key consumption parameter includes the total key consumption quantity K and the service duration t, or includes only the total key consumption quantity K, the centralized controller obtains a quantity P of inventory quantum keys between the source key node and the destination key node. When determining that the total key consumption quantity K is greater than the quantity P of inventory keys, the centralized controller determines that the key relay operation needs to be performed. In another possible manner, if the quantum key consumption parameter includes the service's key consumption speed V, the centralized controller determines that the key relay operation needs to be performed. In this way, a quantity of quantum keys required by a service corresponding to a service request whose service duration is any duration can be ensured to the utmost.

The following describes a case in which the key relay operation needs to be performed.

Optionally, the topology information of the key nodes in the centralized management and control network includes an identifier of each key node, a status of a quantum link between each key node and one or more other key nodes, and an edge weight of any two adjacent key nodes. Optionally, two adjacent key nodes on each path from the source key node to the destination key node are corresponding to one edge weight, and a smaller edge weight corresponding to two adjacent key nodes indicates a weaker quantum key providing capability of the two adjacent key nodes. Each path includes one minimum-edge-weight node pair, and the minimum-edge-weight node pair on each path is two key nodes with a minimum edge weight on the path. Because the topology information of the key nodes includes the edge weight of any two adjacent key nodes, and a smaller edge weight corresponding to two adjacent key nodes indicates a weaker quantum key providing capability of the two adjacent key nodes, the key relay instruction may be determined based on a quantum key providing capability of two adjacent key nodes on each path.

Optionally, the edge weight corresponding to the two adjacent key nodes includes any one of the following content: a sum of a quantity of inventory quantum keys shared by the two adjacent key nodes and a generation quantity of quantum keys that are shared by the two adjacent key nodes in the preset duration; a quantity of inventory quantum keys shared by the two adjacent key nodes; and a generation speed of the quantum keys shared by the two adjacent key nodes. Optionally, the generation quantity of the quantum keys that are shared by the two adjacent key nodes in the preset duration is a product of the preset duration and the generation speed of the quantum keys shared by the two key nodes. In this way, a quantum key providing capability is accurately reflected by using any one or more of the quantity of inventory quantum keys, the generation quantity of the quantum keys that are shared by the two adjacent key nodes in the preset duration, and the generation speed of the quantum keys.

Optionally, after obtaining the Z service requests, and before determining the key relay instructions corresponding to the G service requests, the centralized controller further performs the following operations for each of the Z service requests.

The centralized controller determines each path from the source key node to the destination key node; for each path, the centralized controller determines a current quantum key generation speed of two adjacent key nodes on the path; and if the centralized controller determines that another service request has not been allocated on the path and there is no plan to allocate another service request on the path, the centralized controller determines the current quantum key generation speed as a quantum key generation speed of the two adjacent key nodes; or if the centralized controller determines that another service request has been allocated on the path or there is a plan to allocate another service request on the path, the centralized controller determines a quantum key consumption speed, corresponding to the another service request, of the two adjacent key nodes, and determines a difference between the current quantum key generation speed and the quantum key consumption speed corresponding to the another service request as a quantum key generation speed of the two adjacent key nodes.

Optionally, after obtaining the Z service requests, and before determining the key relay instructions corresponding to the G service requests, the centralized controller further performs the following operations for each of the Z service requests:

The centralized controller determines each path from the source key node to the destination key node; for each path, the centralized controller determines a quantity of inventory quantum keys currently shared by two adjacent key nodes on the path; and if the centralized controller determines that another service request has not been allocated on the path and there is no plan to allocate another service request on the path, the centralized controller determines the quantity of currently shared inventory quantum keys as a quantity of inventory quantum keys shared by the two adjacent key nodes; or if the centralized controller determines that another service request has been allocated on the path or there is a plan to allocate another service request on the path, the centralized controller determines a quantum key consumption quantity, corresponding to the another service request, of the two adjacent key nodes, and determines a difference between the quantity of currently shared inventory quantum keys and the quantum key consumption quantity corresponding to the another service request as a quantity of inventory quantum keys shared by the two adjacent key nodes.

In other words, after obtaining the Z service requests, the centralized controller separately processes the service requests, or processes the Z service requests concurrently. For example, the centralized controller processes a service request 1 and plans to allocate the service request 1 on a path 1, and in this case, when the centralized controller processes a service request 2, the centralized controller needs to consider that there is already a plan to allocate the service request 1 on the path 1, so that a plurality of appropriate key relay instructions that do not conflict with each other are more accurately allocated for a plurality of service requests.

Optionally, after the determining, by the centralized controller based on each of the Z service requests, an identifier of a source service node and an identifier of a destination service node that are corresponding to each service request, and a quantum key consumption parameter of the service request, and before the determining key relay instructions corresponding to G service requests, the method further includes: for each of the Z service requests, performing the following operations: determining, by the centralized controller from the centralized management and control network based on the topology information of the key nodes, all the paths from the source key node to the destination key node, to obtain a first path set; and determining, by the centralized controller from the first path set, Q second paths that meet a first condition corresponding to the quantum key consumption parameter, where Q is an integer greater than or equal to 0.

If the quantum key consumption parameter includes a total key consumption quantity K and service duration t, the first condition corresponding to the quantum key consumption parameter is Formula (1):

$$P+P_m+w_m*t \geq K. \qquad \text{Formula (1)}$$

In Formula (1), P is a quantity of inventory quantum keys between the source key node and the destination key node, $P_m$ is a quantity of inventory quantum keys of a minimum-edge-weight node pair on a path, $w_m$ is a quantum key generation speed of the minimum-edge-weight node pair on the path, t is the service duration, and K is the total key consumption quantity. Optionally, if the quantum key consumption parameter includes only the total key consumption quantity K, t is assumed to be 0 in the foregoing Formula (1), and then calculation is performed.

If the quantum key consumption parameter includes a service's key consumption speed V, the first condition corresponding to the quantum key consumption parameter is:

$$w_m \geq V. \qquad \text{Formula (2)}$$

In Formula (2), $w_m$ is a quantum key generation speed of a minimum-edge-weight node pair on a path, and V is the service's key consumption speed.

It can be learned from the foregoing Formula (1) that when the first condition is met, a sum of the quantity of inventory quantum keys between the source key node and the destination key node, the quantity of inventory quantum keys of the minimum-edge-weight node pair on the path, and the quantum key generation quantity of the minimum-edge-weight node pair on the path are greater than or equal to the total key consumption quantity. It can be learned from the foregoing Formula (2) that when the first condition is met, the quantum key generation speed of the minimum-edge-weight node pair on the path is greater than or equal to the service's key consumption speed. Therefore, a quantity of keys required by the service request can be met by using only one path.

Further, because the topology information of the key nodes includes a status of a link between key nodes, all the paths from the source key node to the destination key node may be first determined from the centralized management and control network based on the topology information of the key nodes, and then the Q second paths that meet the first condition are determined from all the paths, to implement quantum key relay by using the Q second paths, so that a determined key relay path meets a quantity of keys required by the service request.

Optionally, if Q is equal to 1, the centralized controller determines the second path as a key relay path, and determines, based on the key relay path, a key relay instruction corresponding to a service request.

Optionally, if Q is greater than 1, an optimal path may be selected from the Q second paths as a key relay path, for example, a path on which a minimum-edge-weight node pair has a highest quantum key generation speed is selected from the Q second paths, or a path on which a minimum-edge-weight node pair has a largest quantity of inventory quantum keys is selected from the Q second paths. An optional implementation is described as follows. The centralized controller determines a minimum-edge-weight node pair on each second path and an edge weight of each minimum-edge-weight node pair, determines a minimum-edge-weight node pair with a maximum edge weight from the minimum-edge-weight node pairs of all the second paths, determines, as a key relay path, a second path corresponding to the minimum-edge-weight node pair with the maximum edge weight, and determines, based on the key relay path, a key relay instruction corresponding to a service request. In this way, it can be ensured that the selected key relay path meets a quantity of keys required by the service request, and that there is a relatively large quantity of remaining inventory quantum keys after execution of the service request is completed.

Optionally, if Q is equal to 0, to be specific, none of the paths from the source key node to the destination key node can meet the first condition, a plurality of paths are selected to simultaneously perform quantum key relay, so that a generated quantum key meets a requirement of the service request. There is a plurality of specific manners. For example, a plurality of paths that can meet a service requirement is selected from all the paths. This embodiment of this application provides an optional implementation as described in the following. The centralized controller determines S paths from all paths included in the first path set, to obtain a third path set, where S is an integer greater than or equal to 2, and any two paths included in the third path set do not have an overlapping edge; if the centralized controller determines that the S paths meet a second condition corresponding to the quantum key consumption parameter, the centralized controller determines the S paths as the key relay paths, and determines, based on the key relay paths, a key relay instruction corresponding to a service request.

If the quantum key consumption parameter includes a total key consumption quantity K and service duration t, the second condition corresponding to the quantum key consumption parameter is Formula (3):

$$P+\Sigma_{i=1}^{S}(P_i+w_i*t) \geq K. \quad \text{Formula (3)}$$

In Formula (3), P is a quantity of inventory quantum keys between the source key node and the destination key node, a value range of i is [1, S], S is a quantity of paths in the third path set, $P_i$ is a quantity of inventory quantum keys of a minimum-edge-weight node pair on an $i^{th}$ path, $w_i$ is a quantum key generation speed of the minimum-edge-weight node pair on the $i^{th}$ path, t is the service duration, and K is the total key consumption quantity.

In Formula (3), the service request includes the service duration t. For a one-off key consumption request, only the total key consumption quantity K is set and t is not set. An optional solution provided in this embodiment of this application is described in the following. For the one-off key consumption service request, when the foregoing Formula (3) is used, t is assumed to be 0. In other words, only a quantity of inventory quantum keys on the path is considered.

If the quantum key consumption parameter includes a service's key consumption speed V, the second condition corresponding to the quantum key consumption parameter is Formula (4):

$$\Sigma_{i=1}^{S} w_i \geq V \quad \text{Formula (4)}$$

In Formula (4), a value range of i is [1, S], S is a quantity of paths in the third path set, $w_i$ is a quantum key generation speed of a minimum-edge-weight node pair on an $i^{th}$ path, and V is the service's key consumption speed.

It can be learned from the foregoing Formula (3) that when the second condition is met, the quantity of inventory quantum keys between the source key node and the destination key node, a sum of quantities of inventory quantum keys of S minimum-edge-weight node pairs on the S paths in the third path set, and a sum of quantum key generation quantities of the S minimum-edge-weight node pairs on the S paths, a sum of the above three quantities is greater than or equal to the total key consumption quantity. It can be learned from the foregoing Formula (4) that when the second condition is met, a sum of quantum key generation speeds of the S minimum-edge-weight node pairs on the S paths in the third path set is greater than or equal to the service's key consumption speed. Therefore, a quantity of keys required by the service request can be met by using only the S paths.

Further, because the topology information of the key nodes includes a status of a link between key nodes, all the paths from the source key node to the destination key node may be first determined from the centralized management and control network based on the topology information of the key nodes, and then the S paths are determined from all the paths, to ensure that the S paths meet the second condition. In this way, when one path cannot meet a quantity of quantum keys required by the service request, a plurality of paths can be simultaneously used to perform quantum key relay, to ensure that the determined key relay path meets the quantity of keys required by the service request.

Because one key node may be linked to a plurality of key nodes, there may be an overlapping edge between different paths. For example, an overlapping edge between a path "key node A-key node B-key node C-key node D" and a path "key node A-key node B-key node E-key node D" is key node A-key node B. A quantum key needs to be generated on each path when quantum key relay is simultaneously performed by using a plurality of paths; in this case, the overlapping edge is simultaneously located on the plurality of paths. To avoid a case in which the overlapping edge needs to be used to simultaneously serve the plurality of paths, the S paths, in the third path set, between which is no overlapping edge, are determined from all the paths in this embodiment of this application. In other words, one path is selected from a plurality of paths with an overlapping edge. In this way, a plurality of paths in the third path set that meet the foregoing second condition can be selected.

This embodiment of this application provides an optional implementation that is used to determine the S paths from the first path set, to obtain the third path set. Specifically, if the centralized controller determines that any two paths in the first path set do not have an overlapping edge, the centralized controller determines that all the paths included in the first path set are the S paths; or if the centralized controller determines that at least two paths in the first path set have an overlapping edge, for each overlapping edge in the first path set, the centralized controller performs the following operations: determining T paths corresponding to the overlapping edge, and determining, as one of the S paths, a path corresponding to a minimum-edge-weight node pair with a maximum edge weight on the T paths, where T is an integer greater than or equal to 2. Because the path corresponding to the minimum-edge-weight node pair with the maximum edge weight is selected, the path can provide more sufficient quantum keys for the service request. In addition, after the selected path provides the quantum keys for the service request, a difference between a quantity of inventory keys of the minimum-edge-weight node pair on the path and a quantity of inventory keys of a minimum-edge-weight node pair on another path is minimized, so that load capabilities of all paths in the centralized management and control network are balanced.

In this embodiment of this application, sufficient quantum keys can be provided for the service request by the S paths in the third path set. In specific implementation, a quantum key consumption quantity may be randomly allocated for each path. In an optional implementation provided in this embodiment of this application, after quantum key consumption quantities are allocated for the S paths in the third path set, minimum-edge-weight node pairs on all the paths have a same quantity of remaining keys, so that the S paths can better provide a quantum key for a next service request. This solution is specifically described in the following. The quantum key consumption parameter includes the total key consumption quantity K and the service duration t; after determining the S paths as the key relay paths, the centralized controller determines a quantum key consumption quantity $L_i$ corresponding to each key node corresponding to an $i^{th}$ path of the S paths, and $L_i$ meets a requirement of Formula (5):

$$L_i = (P_i + w_i \cdot t) - R. \qquad \text{Formula (5)}$$

In Formula (5), $L_i$ is the quantum key consumption quantity corresponding to each key node corresponding to the $i^{th}$ path of the S paths, a value range of i is [1, S], S is a quantity of paths in the third path set, $P_i$ is a quantity of inventory quantum keys of a minimum-edge-weight node pair on the $i_{th}$ path, $w_i$ is a quantum key generation speed of the minimum-edge-weight node pair on the $i_{th}$ path, t is the service duration, and R is a quantity of remaining keys of the minimum-edge-weight node pair on each path in the third path set.

In Formula (5), the service request includes the service duration t. For a one-off key consumption request, only the total key consumption quantity K is set and t is not set. An optional solution provided in this embodiment of this application is described as follows. For the one-off key consumption service request, when the foregoing Formula (5) is used, t is assumed to be 0. In other words, only a quantity of inventory quantum keys on the path is considered.

It can be learned from Formula (5) that all the paths in the third path set have a same quantity of remaining keys, and L meets a requirement of Formula (6):

$$R = [\Sigma_{i=1}^{S}(P_i + w_i \cdot t) - (K - P)]/S. \qquad \text{Formula (6)}$$

In Formula (6), R is a quantity of remaining keys of a minimum-edge-weight node pair on each path in the third path set, a value range of i is [1, S], S is a quantity of paths in the third path set, $P_i$ is a quantity of inventory quantum keys of a minimum-edge-weight node pair on an $i^{th}$ path, $w_i$ is a quantum key generation speed of the minimum-edge-weight node pair on the $i^{th}$ path, t is the service duration, P is a quantity of inventory quantum keys between the source key node and the destination key node, and K is the total key consumption quantity.

In Formula (6), the service request includes the service duration t. For a one-off key consumption request, only the total key consumption quantity K is set and t is not set. An optional solution provided in this embodiment of this application is described in the following. For the one-off key consumption service request, when the foregoing Formula (6) is used, t is assumed to be 0. In other words, only a quantity of inventory quantum keys on the path is considered.

The foregoing several solutions describe a solution of determining the key relay path when it is determined that the key relay operation needs to be performed. The following describes the foregoing solution by using several specific examples.

Example a1

Figure 3B:
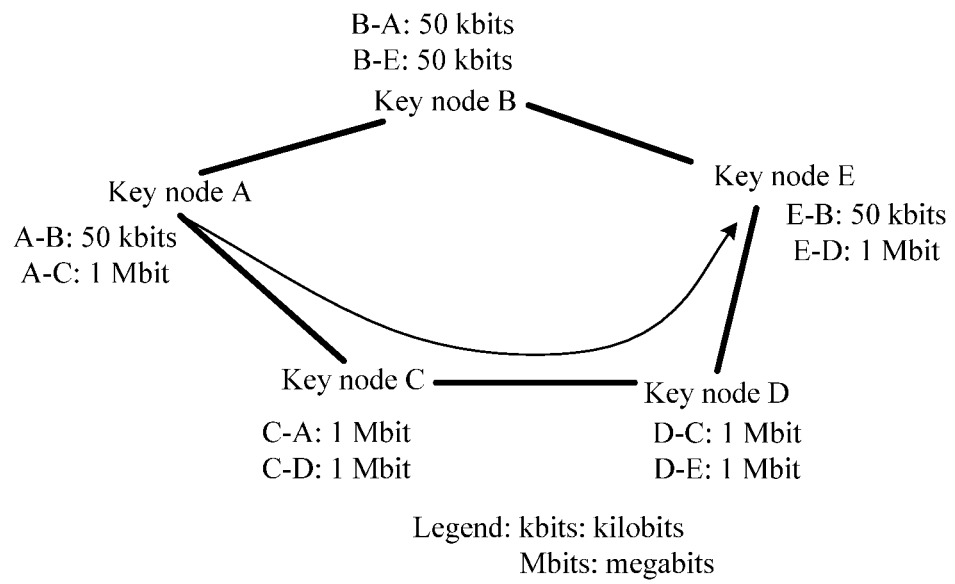
FIG. 3b is a schematic diagram of a key relay path according to an embodiment of this application.

FIG. 3b is an example of a schematic diagram of a key relay path according to an embodiment of this application. As shown in FIG. 3b, the centralized management and control network includes a key node A, a key node B, a key node C, a key node D, and a key node E, and the five key nodes are successively linked. A quantity of inventory quantum keys between the key node A and the key node B is 50 kbits (kilobit), a quantity of inventory quantum keys between the key node B and the key node E is 50 kbits, a quantity of inventory quantum keys between key node E and the key node D is 1 Mbit (megabit), a quantity of inventory quantum keys between the key node C and the key node D is 1 Mbit, and a quantity of inventory quantum keys between the key node C and the key node A is 1 Mbit.

A total key consumption quantity of a service request is 50 kbits, and this service request is a one-off key consumption request. In this case, during determining of the key relay path, t is assumed to be 0. In other words, only a quantity of inventory keys on the path is considered. In this example, an edge weight that is a quantity of inventory quantum keys shared by two key nodes is used to determine the key relay path. A source key node is the key node A, and a destination key node is the key node E. A specific process of selection performed by the centralized controller is described in the following. The centralized controller determines all paths from the key node A to the key node E. The paths are "key node A-key node B-key node E" and "key node A-key node C-key node D-key node E", and the two paths form a first path set.

Because quantities of inventory quantum keys between adjacent key nodes on the path "key node A-key node B-key node E" are all 50 kbits, a minimum-edge-weight node pair on the path is either the key node A and the key node B or the key node B and the key node E. Because quantities of inventory quantum keys between adjacent key nodes on the path "key node A-key node C-key node D-key node E" are all 1 Mbit, a minimum-edge-weight node pair on the path is any one of the key node A and the key node C, the key node C and the key node D, and the key node D and the key node E.

Both the two paths in the first path set meet the foregoing first condition, and therefore the two paths in the first path set are two second paths that meet the first condition.

When an edge weight is a quantity of inventory quantum keys shared by two key nodes, an edge weight of the minimum-edge-weight node pair on the path "key node A-key node B-key node E" is 50 kbits, and an edge weight of the minimum-edge-weight node pair on the path "key node A-key node C-key node D-key node E" is 1 Mbit.

Optionally, to make the key node better provide a quantum key for a subsequent service request, that is, to make quantum keys left on the path as many as possible after the current service request, in this embodiment of this application, a second path corresponding to a minimum-edge-weight node pair with a maximum edge weight is selected as the key relay path, to be specific, the path "key node A-key node C-key node D-key node E" whose edge weight is 1 Mbit is used as the key relay path.

Example a2

Figure 3C:
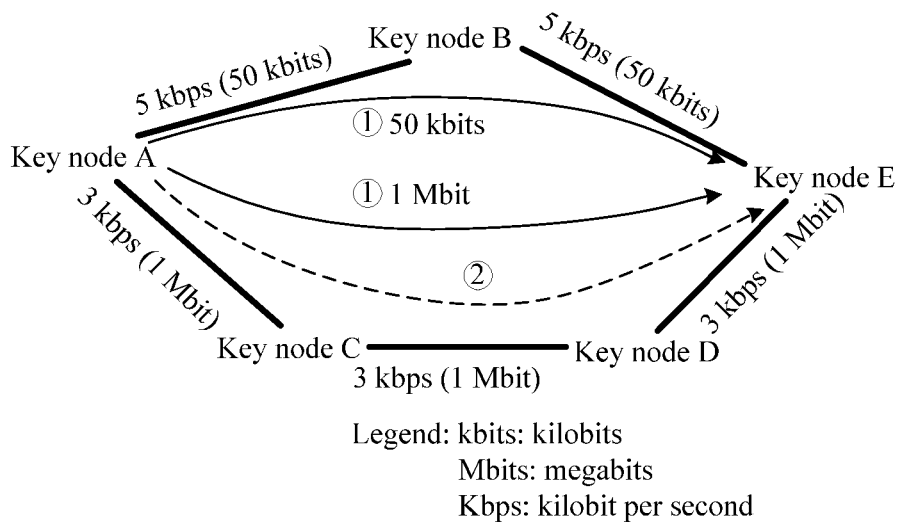
FIG. 3c is a schematic diagram of selection of another key relay path according to an embodiment of this application.

FIG. 3c is an example of a schematic diagram of selection of another key relay path according to an embodiment of this application. As shown in FIG. 3c, the centralized management and control network includes a key node A, a key node B, a key node C, a key node D, and a key node E, and the five key nodes are successively linked. A quantity of inventory quantum keys between the key node A and the key node B is 50 kbits, and a quantum key generation speed is 5 kbps (kilobit per second); a quantity of inventory quantum keys between the key node B and the key node E is 50 kbits, and a quantum key generation speed is 5 kbps; a quantity of inventory quantum keys between the key node E and the key node D is 1 Mbit, and a quantum key generation speed is 3 kbps; a quantity of inventory quantum keys between the key node C and the key node D is 1 Mbit, and a quantum key generation speed is 3 kbps; and a quantity of inventory quantum keys between the key node C and the key node A is 1 Mbit, and a quantum key generation speed is 3 kbps.

If a total key consumption quantity of a service request is 1.05 Mbits, during determining of the key relay path, t is assumed to be 0. In other words, only a quantity of inventory keys on the path is considered. In this example, an edge weight that is a quantity of inventory quantum keys shared by two key nodes is used to determine the key relay path. A source key node is the key node A, and a destination key node is the key node E. A specific process of selection performed by the centralized controller is described in the following. The centralized controller determines all paths from the key node A to the key node E. The paths are "key node A-key node B-key node E" and "key node A-key node C-key node D-key node E", and the two paths form a first path set.

Because quantities of inventory quantum keys between adjacent key nodes on the path "key node A-key node B-key node E" are all 50 kbits, a minimum-edge-weight node pair on the path is either the key node A and the key node B or the key node B and the key node E. Because quantities of inventory quantum keys between adjacent key nodes on the path "key node A-key node C-key node D-key node E" are all 1 Mbit, a minimum-edge-weight node pair on the path is any one of the key node A and the key node C, the key node C and the key node D, and the key node D and the key node E.

Neither of the two paths in the first path set meets the foregoing first condition. It is determined that the two paths meet the second condition, and t is assumed to be 0. To be specific, the total key consumption quantity is 1.05 Mbits and is equal to a sum of a quantity (50 kbits) of inventory quantum keys of a minimum-edge-weight node pair on the path "key node A-key node B-key node E" and a quantity (1 Mbit) of inventory quantum keys of a minimum-edge-weight node pair on the path "key node A-key node C-key node D-key node E".

S paths that have no overlapping edge are determined from the first path set, to obtain a third path set. Because there is no overlapping edge between two paths in the first path set, the first path set is the same as the third path set. In this case, both the two paths are determined as key relay paths, and quantum key relay is simultaneously performed by using the two paths.

As shown in FIG. 3c, because the quantum key consumption parameter includes the total key consumption quantity K, a quantum key consumption quantity corresponding to each key node allocated for the path "key node A-key node B-key node E" is 50 kbits, and a quantum key consumption quantity corresponding to each key node allocated for the path "key node A-key node C-key node D-key node E" is 1 Mbit. As shown in FIG. 3c, quantities of remaining keys on both paths with an identifier "0" are 0. In other words, in a process of performing a service request, inventory quantum keys on the two paths are consumed. However, as the service request proceeds, a new quantum key is generated on the two paths.

If a quantum key generation speed of a minimum-edge-weight node pair on the path "key node A-key node C-key node D-key node E" (a path with an identifier "O" in FIG. 3c) is greater than or equal to 0.05 Mbit, and the total key consumption quantity of the service request is less than 1.05 Mbit, in consideration that a real-time quantum key generation speed on the path is greater than or equal to 0.05 Mbit, only this path may be selected as the key relay path. Optionally, when the total key consumption quantity of the service request is equal to 1.05 Mbits, to avoid a case in which all quantum keys on the path are consumed, two paths may be selected in this case.

Example a3

Figure 3D:
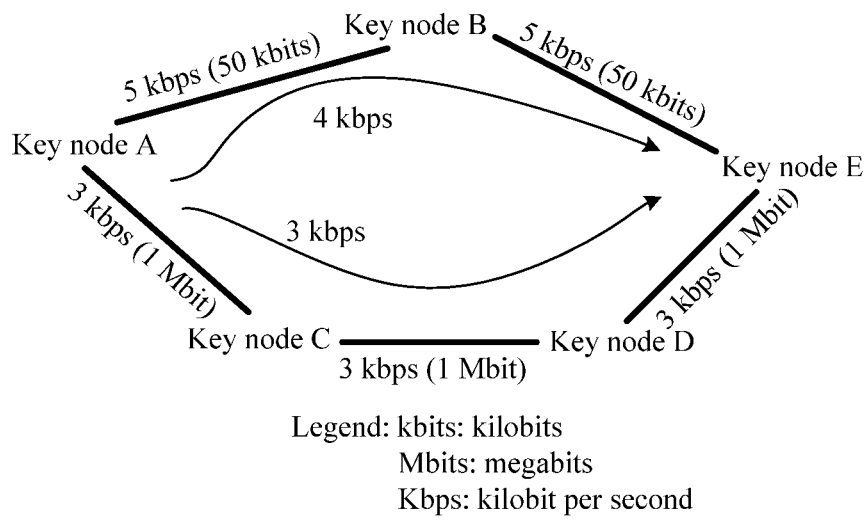
FIG. 3d is a schematic diagram of selection of another key relay path according to an embodiment of this application.

FIG. 3d is an example of a schematic diagram of selection of another key relay path according to an embodiment of this application. As shown in FIG. 3d, a structure of the centralized management and control network is consistent with that in FIG. 3c, and details are not described herein again.

The service's key consumption speed of the service request is 7 kbps. In this example, an edge weight that is a generation speed of a quantum key shared by two key nodes is used to determine the key relay path. A source key node is a key node A, and a destination key node is a key node E. A specific process of selection performed by the centralized controller is described in the following. The centralized controller determines all paths from the key node A to the key node E. The paths are "key node A-key node B-key node E" and "key node A-key node C-key node D-key node E", and the two paths form a first path set.

Because a generation speed of a quantum key shared by adjacent key nodes on the path "key node A-key node B-key node E" is 5 kbps, a minimum-edge-weight node pair on the path is either the key node A and the key node B or the key node B and the key node E. Because a generation speed of a quantum key shared by adjacent key nodes on the path "key node A-key node C-key node D-key node E" is 3 kbps, a minimum-edge-weight node pair on the path is any one of the key node A and the key node C, the key node C and the key node D, and the key node D and the key node E.

Neither of the two paths in the first path set meets the first condition. It is determined that the foregoing two paths meet the second condition. To be specific, the service's key consumption speed 7 kbps is less than a sum of a quantum key generation speed (5 kbps) of a minimum-edge-weight node pair on the path "key node A-key node B-key node E" and a quantum key generation speed (3 kbps) of a minimum-edge-weight node pair on the path "key node A-key node C-key node D-key node E".

S paths that have no overlapping edge are determined from the first path set, to obtain a third path set. Because there is no overlapping edge between two paths in the first path set, the first path set is the same as the third path set. In this case, both the two paths are determined as key relay paths, and quantum key relay is simultaneously performed by using the two paths.

Optionally, the quantum key consumption parameter includes the service's key consumption speed V, and after determining the S paths as the key relay paths, the centralized controller determines a quantum key consumption speed corresponding to each of Y paths. A smaller quantity of inventory quantum keys of a minimum-edge-weight node pair corresponding to each of the Y paths indicates a larger difference between a quantum key generation speed corresponding to the minimum-edge-weight node pair and a quantum key consumption speed corresponding to the path corresponding to the minimum-edge-weight node pair. In this way, it can be ensured to the utmost that after each path has served the service request, minimum-edge-weight node pairs on all the paths have a same quantity of remaining keys.

As shown in FIG. 3d, because the path "key node A-key node B-key node E" has a relatively small quantity of inventory quantum keys, a difference between a quantum key generation speed of a minimum-edge-weight node pair on the path and a quantum key consumption speed needs to be relatively large. Therefore, a quantum key consumption speed corresponding to each key node allocated for the path "key node A-key node B-key node E" is 4 kbps, and a quantum key consumption speed corresponding to each key node allocated for the path "key node A-key node C-key node D-key node E" is 3 kbps. In this case, a difference between the quantum key generation speed of the minimum-edge-weight node pair on the path "key node A-key node B-key node E" and the quantum key consumption speed is 1 kbps, and a difference between the quantum key generation speed of the minimum-edge-weight node pair on the path "key node A-key node C-key node D-key node E" and the quantum key consumption speed is 0 kbps. In this way, it can be ensured that quantum keys are reserved on each path as many as possible after the path has served the service request.

In this embodiment of this application, there may be a plurality of services simultaneously. Optionally, for each of the Z service requests, the following operations are performed: determining, by the centralized controller, each path from the source key node to the destination key node; determining, by the centralized controller for each path, a current quantum key generation speed of two adjacent key nodes on the path; and if the centralized controller determines that another service request has not been allocated on the path and there is no plan to allocate another service request on the path, determining the current quantum key generation speed as a quantum key generation speed of the two adjacent key nodes; or if the centralized controller determines that another service request has been allocated on the path or there is a plan to allocate another service request on the path, determining a quantum key consumption speed, corresponding to the another service request, of the two adjacent key nodes, and determining a difference between the current quantum key generation speed and the quantum key consumption speed corresponding to the another service request as a quantum key generation speed of the two adjacent key nodes. In this way, when the key relay path is determined for the current service request, a service request that has been allocated on the key relay path may be considered, so that quantum keys can be simultaneously provided for a plurality of service requests.

A case of a plurality of service requests is described by using the following examples a4 and a5.

Example a4

Figure 3E:
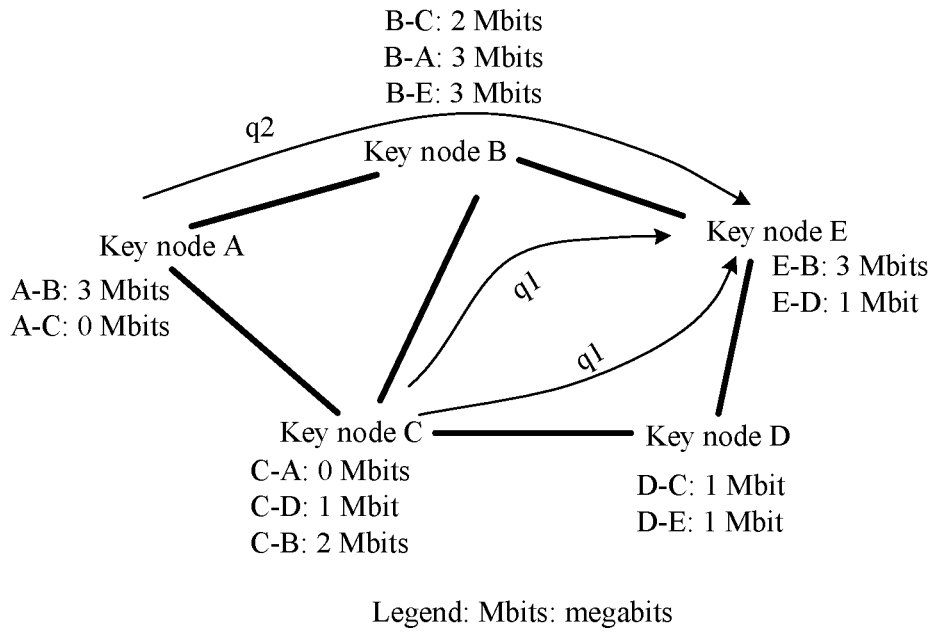
FIG. 3e is a schematic diagram of selection of another key relay path according to an embodiment of this application.

FIG. 3e is an example of a schematic diagram of selection of another key relay path according to an embodiment of this application. As shown in FIG. 3e, the centralized management and control network includes a key node A, a key node B, a key node C, a key node D, and a key node E, the five key nodes are successively linked, and the key node C is linked to the key node B. A quantity of inventory quantum keys between the key node A and the key node B is 3 Mbits, a quantity of inventory quantum keys between the key node B and the key node E is 3 Mbits, a quantity of inventory quantum keys between the key node E and the key node D is 1 Mbit, a quantity of inventory quantum keys between the key node C and the key node D is 1 Mbit, a quantity of inventory quantum keys between the key node C and the key node A is 0 Mbits, and a quantity of inventory quantum keys between the key node C and the key node B is 2 Mbits.

There are two service requests simultaneously. A total key consumption quantity of a service request q1 is 2 Mbits, and a total key consumption quantity of a service request q2 is 2 Mbits. A source key node in the service request q1 is the key node C, and a destination key node is the key node E. A source key node in the service request q2 is the key node A, and a destination key node is the key node E. In this example, an edge weight that is a quantity of inventory quantum keys shared by two key nodes is used to determine the key relay path.

The source key node in the service request q1 is the key node C, and the destination key node is the key node E. A specific process of selection performed by the centralized controller is: The centralized controller determines all paths from the key node C to the key node E. The paths are "key node C-key node B-key node E" and "key node C-key node D-key node E", and the two paths form a first path set.

Because quantities of inventory quantum keys between adjacent key nodes on the path "key node C-key node B-key node E" are respectively 2 Mbits and 3 Mbits, a minimum-edge-weight node pair on the path is the key node C and the key node B. Because quantities of inventory quantum keys between adjacent key nodes on the path "key node C-key node D-key node E" each are 1 Mbit, a minimum-edge-weight node pair on the path is either the key node C and the key node D or the key node D and the key node E. The two paths form the first path set.

It is determined that only the path "key node C-key node B-key node E" meets the first condition.

The source key node in the service request q2 is the key node A, and the destination key node is the key node E. A specific process of selection performed by the centralized controller is: The centralized controller determines all paths from the key node A to the key node E. The paths are "key node A-key node B-key node E" and "key node A-key node C-key node D-key node E", and the two paths form a first path set.

Because quantities of inventory quantum keys between adjacent key nodes on the path "key node A-key node B-key node E" each are 3 Mbits, a minimum-edge-weight node pair on the path is either the key node A and the key node B or the key node B and the key node E. Because quantities of inventory quantum keys between adjacent key nodes on the path "key node A-key node C-key node D-key node E" are respectively 0 Mbits, 1 Mbit, and 1 Mbit, a minimum-edge-weight node pair on the path is the key node A and the key node C.

It is determined that only the path "key node A-key node B-key node E" meets the first condition.

If a relay path is allocated for the request q1 first, the path "key node C-key node B-key node E" that meets the first condition is selected. However, after the allocation, a quantity of remaining keys of "key node B-key node E" is only 1 Mbit, and an effective relay path cannot be allocated for the request q2. The centralized controller attempts to allocate a relay path for the request q2 first, and selects the path "key node A-key node B-key node E" that meets the first condition.

Because there is further a plan to allocate a service request q2 on "key node B-key node E", a current quantity of inventory quantum keys of "key node B-key node E" is 3 Mbits, and a quantity of inventory quantum keys expected to be consumed is 2 Mbits, and a quantity of inventory keys of "key node B-key node E" is 1 Mbit.

Neither of the two paths in the first path set meets the first condition. With reference to a similar solution in the foregoing example, it is determined that key relay paths for the service request q1 are "key node C-key node B-key node E" and "key node C-key node D-key node E", and a quantum key consumption quantity corresponding to each key node allocated for each path is 1 Mbit.

In this embodiment, the centralized controller efficiently and uniformly analyzes and calculates key relay paths for all service requests. To be specific, the centralized controller may consider that there are simultaneously a plurality of service requests, and separately allocate appropriate key relay paths that do not conflict with each other to all the service requests. Key requirements of both the service requests q1 and q2 are met.

In this embodiment, a solution is provided in which paths are allocated for a plurality of service requests one by one. By using powerful computing and storage capabilities of the centralized controller, a set of all paths that meet the first condition, the second condition, and the third condition may be calculated for all the service requests, as many service requests as possible are met while priorities of the service requests are considered in combination, and key relay paths are determined for the plurality of service requests through analysis and calculation.

Example a5

Figure 3F:
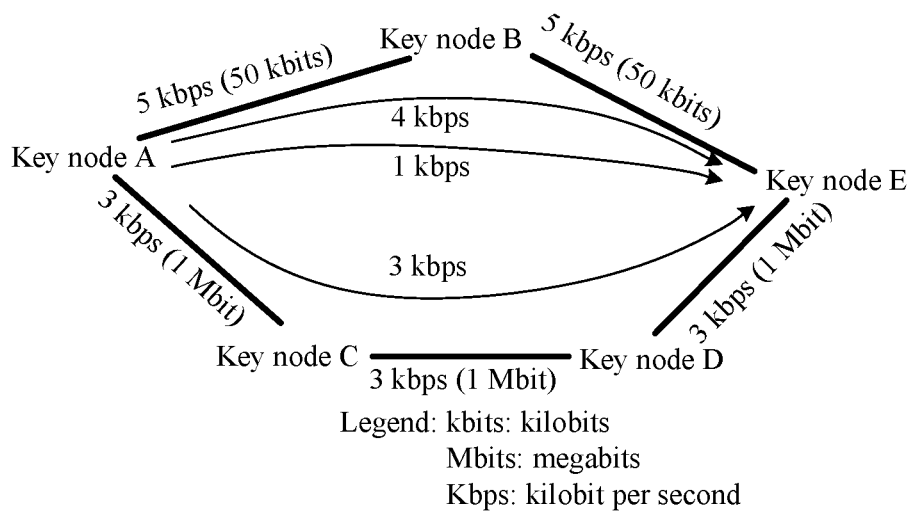
FIG. 3f is a schematic diagram of selection of another key relay path according to an embodiment of this application.

FIG. 3f is an example of a schematic diagram of selection of another key relay path according to an embodiment of this application. As shown in FIG. 3f, a structure is the same as that in FIG. 3c, and details are not described herein again.

There are two service requests, a service's key consumption speed of a service request q1 is 4 kbps, a source key node is a key node A, and a destination key node is a key node E. According to a solution similar to the foregoing content, it is determined that a key relay path for the service request q1 is a path "key node A-key node B-key node E".

A service's key consumption speed of a subsequently added service request q2 is 4 kbps, a source key node is the key node A, and a destination key node is the key node E. In this case, the service request q1 is further allocated on "key node A-key node B-key node E", a current quantum key generation speed of "key node A-key node B-key node E" is 5 kbps, and a quantum key consumption speed corresponding to another service request is 4 kbps. Therefore, a quantum key generation speed of "key node A-key node B-key node E" is 1 kbps.

With reference to a fact that the quantum key generation speed of the path "key node A-key node B-key node E" is 1 kbps, and a quantum key generation speed of the path "key node A-key node C-key node D-key node E" is 3 kbps, key relay paths are determined for the service request q2. Optionally, the key relay paths are the two paths. A quantum key consumption speed corresponding to each key node allocated for the path "key node A-key node B-key node E" is 1 kbps, and a quantum key consumption speed corresponding to each key node allocated for the path "key node A-key node C-key node D-key node E" is 3 kbps.

In this embodiment of this application, after determining the key relay path by using the various solutions provided above, the centralized controller delivers the key relay path to each key node included in the key relay path. Optionally, the key node receives the key relay path delivered by the centralized controller, and the key node performs quantum key relay based on the key relay path delivered by the centralized controller.

Optionally, the performing, by the key node, quantum key relay based on the key relay path delivered by the centralized controller includes: determining, by the key node, E previous-hop key nodes and F next-hop key nodes of the key node from the key relay path, where both E and F are integers greater than or equal to 0; and performing, by the key node, quantum key relay with the E previous-hop key nodes and the F next-hop key nodes. If the key relay path includes at least two paths from the source key node to the destination key node, details are described as follows. If the key node is the source key node, E is 0, and F is an integer greater than or equal to 2; if the key node is the destination key node, E is an integer greater than or equal to 2, and F is 0; and if the key node is a key node in an intermediate position on the key relay path, both E and F are 1, or both E and F are integers greater than or equal to 1.

Specifically, in this embodiment of this application, there may be one or more paths from the source key node to the destination key node. In this case, when some service requests require a relatively large quantity of quantum keys, or when a plurality of service requests runs simultaneously, a quantity of quantum keys required by each service request can be ensured to a maximum extent.

Figure 3G:
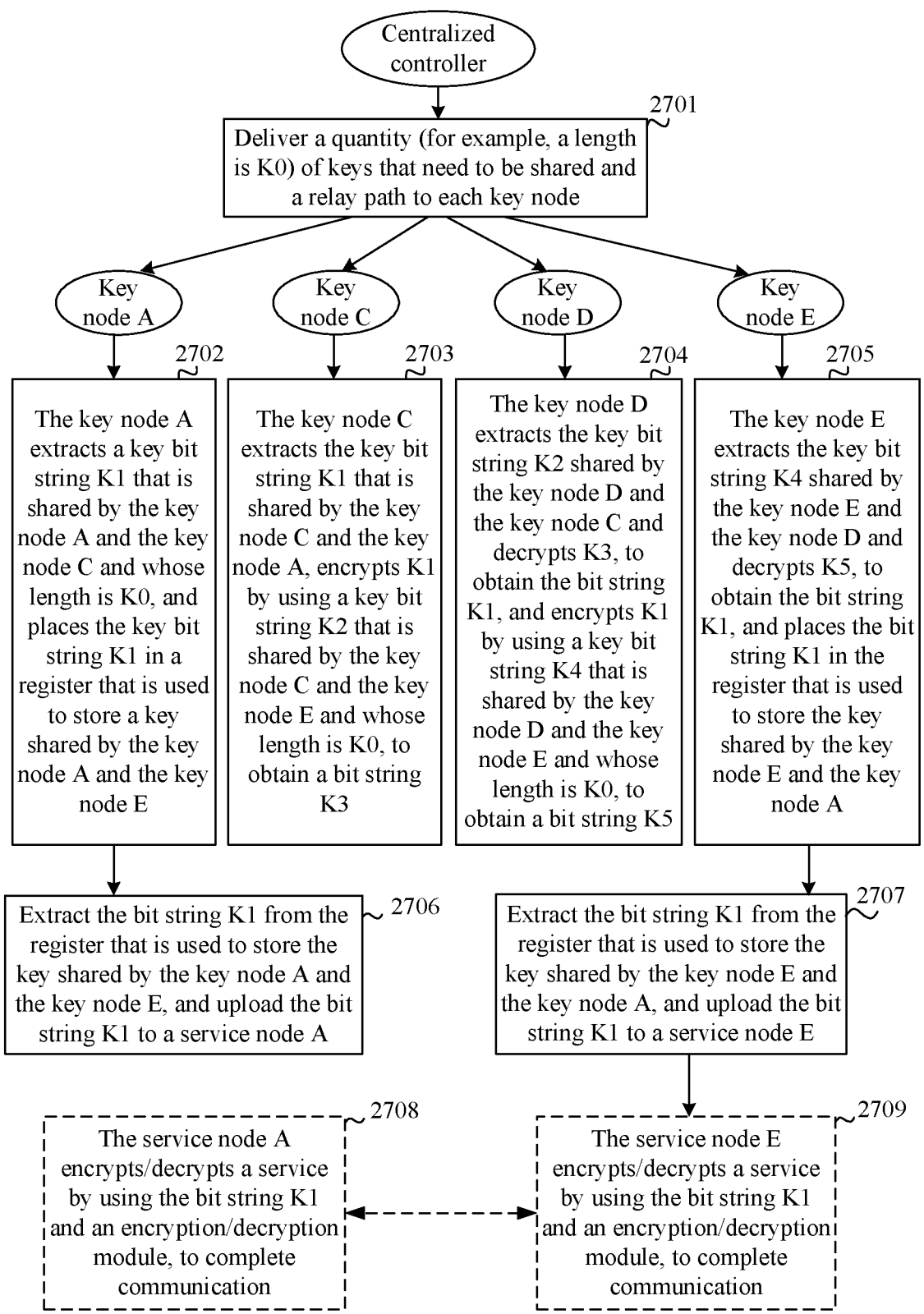
FIG. 3g is a schematic flowchart of a quantum key relay method according to an embodiment of this application.

Based on the foregoing content, to further describe the solution provided in the embodiments of this application, FIG. 3g is an example of a schematic flowchart of a quantum key relay method according to an embodiment of this application. As shown in FIG. 3g, the method includes the following steps.

Step 2701: A centralized controller obtains a service request and topology information of key nodes in a centralized management and control network, determines a key relay path, and determines a key relay instruction. Optionally, before step 2701, the key node reports the topology information of the key nodes to the centralized controller. After step 2701, the key node receives the key relay instruction delivered by the centralized controller, and the key node performs quantum key relay based on the key relay instruction delivered by the centralized controller. The key node is one of M key nodes included in the centralized management and control network in this embodiment of this application.

Optionally, the key relay instruction is used to indicate any one or more of the following content:

the key node determines, as a quantum key shared by the key node and a destination key node, a determined first target quantum key shared by the key node and a next-hop key node of the key node;

the key node determines a second target quantum key shared by the key node and a previous-hop key node of the key node, encrypts the second target quantum key by using a first encryption and decryption quantum key shared by the key node and a next-hop key node of the key node, and transmits the obtained encrypted second target quantum key to the next-hop key node of the key node;

the key node determines a second encryption and decryption quantum key shared by the key node and a previous-hop key node of the key node, decrypts an obtained encrypted third target quantum key by using the second encryption and decryption quantum key, encrypts the third target quantum key by using a third encryption and decryption quantum key shared by the key node and a next-hop key node of the key node, and transmits the obtained encrypted third target quantum key to the next-hop key node of the key node; and the key node determines a fourth encryption and decryption quantum key shared by the key node and a previous-hop key node of the key node, and decrypts an obtained encrypted fourth target quantum key by using the fourth encryption and decryption quantum key, to obtain a target quantum key.

It is assumed that a source key node is a key node A, the destination key node is a key node E, and the key relay path is "key node A-key node B-key node E". In this case, the centralized controller delivers the key relay path to the key node A, the key node B, and the key node E.

Optionally, the key relay instruction is further used to indicate any one or more of the following content:
- a key bit length of the first target quantum key, a key bit length of the second target quantum key, a key bit length of the third target quantum key, a key bit length of the fourth target quantum key, a key bit length of the first encryption and decryption quantum key, a key bit length of the second encryption and decryption quantum key, a key bit length of the third encryption and decryption quantum key, and a key bit length of the fourth encryption and decryption quantum key; a key relay rate between the key node and the previous-hop key node of the key node; a key relay rate between the key node and the next-hop key node of the key node; key relay duration between the key node and the previous-hop key node of the key node; key relay duration between the key node and the next-hop key node of the key node; a key relay amount between the key node and the previous-hop key node of the key node; and a key relay amount between the key node and the next-hop key node of the key node.

An optional implementation solution is described in the following. The centralized controller analyzes, calculates, and generates, based on information reported by the key node and a service node, a configuration command that needs to be delivered to each key management node (the configuration command includes the key relay path); encapsulates the configuration command into a complete data block according to a specific format; encapsulates the data block into a standard Internet Protocol (IP) packet, an optical transport network (OTN) data frame, or the like; and transmits the standard Internet Protocol packet, the optical transport network data frame, or the like to the key node by using a network. The key node receives the standard IP packet, the OTN data frame, or the like; parses out the data block in the standard IP packet, the OTN data frame, or the like; reads, according to a pre-agreed encapsulation format, the configuration command included in the data block; obtains the key relay path; and performs corresponding key processing.

After receiving the key relay path, each key node performs step 2702, step 2703, step 2704, and step 2705 to generate a quantum key shared by the key node A and the key node E. Details are as follows:

Step 2702: A key node A extracts a key bit string K1 that is shared by the key node A and a key node C and whose length is K0, and places the key bit string K1 in a register that is used to store a key shared by the key node A and a key node E. Then, step 2703 is performed. Optionally, a first target quantum key that is shared by the key node A and the next-hop key node C of the key node and that is determined by the key node A is the key bit string K1. In other words, the quantum key shared by the key node A and the destination key node E is the key bit string K1.

Step 2703: The key node C extracts the key bit string K1 that is shared by the key node C and the key node A, encrypts K1 by using a key bit string K2 that is shared by the key node C and the key node E and whose length is K0, to obtain a bit string K3, and sends the bit string K3 to a key node D. Then, step 2704 is performed. The key node C determines a second target quantum key K1 shared by the key node C and the previous-hop key node A of the key node C, encrypts the second target quantum key K1 by using a first encryption and decryption quantum key K2 shared by the key node C and the next-hop key node D of the key node C, to obtain the encrypted second target quantum key, namely, the bit string K3, and transmits K3 to the next-hop key node D of the key node C.

Step 2704: The key node D extracts the key bit string K2 shared by the key node D and the key node C and decrypts K3, to obtain the bit string K1, and encrypts K1 by using a key bit string K4 that is shared by the key node D and the key node E and whose length is K0, to obtain a bit string K5. Then, step 2705 is performed. The key node D determines a second encryption and decryption quantum key K2 shared by the key node D and the previous-hop key node C of the key node D, decrypts an obtained encrypted third target quantum key K3 by using the second encryption and decryption quantum key K2, encrypts the third target quantum key by using a third encryption and decryption quantum key K4 shared by the key node D and the next-hop key node E of the key node D, to obtain the encrypted third target quantum key, namely, the bit string K5, and transmits the bit string K5 to the next-hop key node E of the key node D.

Step 2705: The key node E extracts the key bit string K4 shared by the key node E and the key node D and decrypts K5, to obtain the bit string K1, and places the bit string K1 in the register that is used to store the key shared by the key node E and the key node A; and the key node E determines a fourth encryption and decryption quantum key K4 shared by the key node E and the previous-hop key node D of the key node E, and decrypts an obtained encrypted fourth target quantum key K5 by using the fourth encryption and decryption quantum key K4, to obtain the target quantum key K1.

It can be learned that after the foregoing step 2702, step 2703, step 2704, and step 2705, after completing quantum key relay operations, the key node A and the key node E respectively read, from respective registers, a corresponding quantum key shared by the key node A and the key node E, to encrypt and decrypt a service by using the quantum key. Specific steps are described in step 2706, step 2707, step 2708, and step 2709.

Step 2706: After the foregoing step 2702, step 2703, step 2704, and step 2705, extract the bit string K1 from the register that is used to store the key shared by the key node A and the key node E, transmit the bit string K1 to a service node A, and then perform step 2708.

Step 2707: After the foregoing step 2702, step 2703, step 2704, and step 2705, extract the bit string K1 from the register that is used to store the key shared by the key node A and the key node E, transmit the bit string K1 to a service node E, and then perform step 2709.

Step 2708: The service node A encrypts/decrypts a service by using the bit string K1 and an encryption/decryption module.

Step 2709: The service node E encrypts/decrypts a service by using the bit string K1 and an encryption module or a decryption module.

By using the foregoing step 2707 and step 2708, secure communication is implemented between the service node A and the service node E. In this example, a service node corresponding to the key node A is the service node A, and a service node corresponding to the key node E is the service node E.

Based on the foregoing content, in this embodiment of this application, to be compatible with a prior-art network, the key node in this embodiment of this application may include various interfaces and is configured to connect to the service node and the centralized controller, and each service node also includes various interfaces and is configured to connect to the centralized controller and the key node. The key nodes in this embodiment of this application may be classified into a key management node and a key generation node at a key generation layer.

Figure 4:
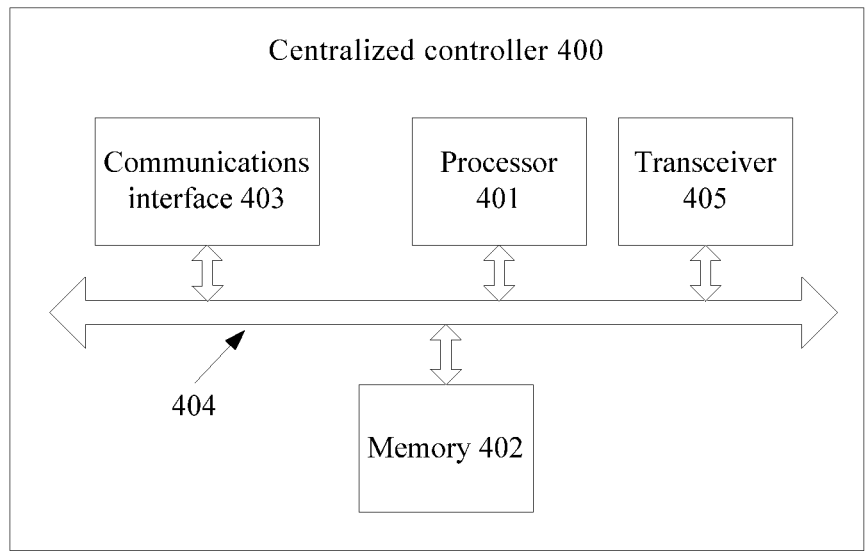
FIG. 4 is a schematic structural diagram of a centralized controller according to an embodiment of this application.

Based on a same concept, FIG. 4 is an example of a schematic structural diagram of a centralized controller according to an embodiment of this application. As shown in FIG. 4, the centralized controller is configured to perform the foregoing method procedure, and the centralized controller 400 is applicable to a centralized management and control network. The centralized management and control network includes the centralized controller, N service nodes, and M key nodes. One service node is corresponding to one key node, both N and M are integers greater than or equal to 2, and the centralized controller 400 includes a processor 401, a memory 402, and a transceiver 405. Optionally, the centralized controller 400 further includes a bus 404 and a communications interface 403.

The memory is configured to store a program and an instruction.

The processor is configured to perform the following operations by invoking the program and the instruction that are stored in the memory: determining, based on each of Z service requests obtained by the transceiver, an identifier of a source service node and an identifier of a destination service node that are corresponding to each service request, and a quantum key consumption parameter of the service request; and determining, based on the identifier of the source service node and the identifier of the destination service node that are corresponding to each of the Z service requests, the quantum key consumption parameter, and topology information of the key nodes in the centralized management and control network, key relay instructions corresponding to G service requests, where the source service node is corresponding to a source key node, the destination service node is corresponding to a destination key node, Z is an integer greater than or equal to 1, and G is an integer less than or equal to Z and greater than or equal to 1.

The transceiver is configured to: obtain the Z service requests, and deliver the key relay instructions corresponding to the G service requests to key nodes corresponding to the key relay instructions, so that the key nodes perform quantum key relay based on the key relay instructions, to generate a shared quantum key between the source key node and the destination key node.

The bus may be a Peripheral Component Interconnect (PCI) bus, an Extended Industry Standard Architecture (EISA) bus, or the like. The bus may be classified into an address bus, a data bus, a control bus, and the like. For ease of representation, the bus is represented by using only one bold line in FIG. 4, but it does not indicate that there is only one bus or one type of bus.

The memory may include a volatile memory, for example, a random-access memory (RAM); or the memory may include a non-volatile memory, for example, a flash memory, a hard disk drive (HDD), or a solid-state drive (SSD); or the memory may include a combination of the foregoing types of memories.

The communications interface may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

Optionally, the topology information of the key nodes in the centralized management and control network includes an identifier of each key node, a status of a quantum link between each key node and one or more other key nodes, and an edge weight of any two adjacent key nodes. Two adjacent key nodes on each path from the source key node to the destination key node are corresponding to one edge weight, and a smaller edge weight corresponding to two adjacent key nodes indicates a weaker quantum key providing capability of the two adjacent key nodes. Each path includes one minimum-edge-weight node pair, and the minimum-edge-weight node pair on each path is two key nodes with a minimum edge weight on the path.

Optionally, the edge weight corresponding to the two adjacent key nodes includes any one of the following content: a sum of a quantity of inventory quantum keys shared by the two adjacent key nodes and a generation quantity of quantum keys that are shared by the two adjacent key nodes in the preset duration; a quantity of inventory quantum keys shared by the two adjacent key nodes; and a generation speed of the quantum keys shared by the two adjacent key nodes.

Optionally, the processor is further configured to: for each of the Z service requests, perform the following operations: determining, by the centralized controller, each path from the source key node to the destination key node; determining, by the centralized controller for each path, a current quantum key generation speed of two adjacent key nodes on the path; and if the centralized controller determines that another service request has not been allocated on the path and there is no plan to allocate another service request on the path, determining the current quantum key generation speed as a quantum key generation speed of the two adjacent key nodes; or if the centralized controller determines that another service request has been allocated on the path or there is a plan to allocate another service request on the path, determining a quantum key consumption speed, corresponding to the another service request, of the two adjacent key nodes, and determining a difference between the current quantum key generation speed and the quantum key consumption speed corresponding to the another service request as a quantum key generation speed of the two adjacent key nodes.

Optionally, the processor is further configured to: for each of the Z service requests, perform the following operations: determining, by the centralized controller, each path from the source key node to the destination key node; determining, by the centralized controller for each path, a quantity of inventory quantum keys currently shared by two adjacent key nodes on the path; and if the centralized controller determines that another service request has not been allocated on the path and there is no plan to allocate another service request on the path, determining the quantity of currently shared inventory quantum keys as a quantity of inventory quantum keys shared by the two adjacent key nodes; or if the centralized controller determines that another service request has been allocated on the path or there is a plan to allocate another service request on the path, determining a quantum key consumption quantity, corresponding to the another service request, of the two adjacent key nodes, and determining a difference between the quantity of currently shared inventory quantum keys and the quantum key consumption quantity corresponding to the another service request as a quantity of inventory quantum keys shared by the two adjacent key nodes.

Optionally, the processor is further configured to: for each of the Z service requests, perform the following operations: determining, by the centralized controller from the centralized management and control network based on the topology information of the key nodes, all the paths from the source key node to the destination key node, to obtain a first path set; and determining, by the centralized controller from the first path set, Q second paths that meet a first condition corresponding to the quantum key consumption parameter, where Q is an integer greater than or equal to 0; if the quantum key consumption parameter includes a total key consumption quantity K and service duration t, the first condition corresponding to the quantum key consumption parameter is: $P+P_m+w_m*t \geq K$; or if the quantum key consumption parameter includes a service's key consumption speed V, the first condition corresponding to the quantum key consumption parameter is: $w_m \geq V$, where P is a quantity of inventory quantum keys between the source key node and the destination key node, $P_m$ is a quantity of inventory quantum keys of a minimum-edge-weight node pair on a path, and $w_m$ is a quantum key generation speed of the minimum-edge-weight node pair on the path.

Optionally, the processor is further configured to: if Q is equal to 1, determine, by the centralized controller, the second path as a key relay path, and determine, based on the key relay path, a key relay instruction corresponding to a service request; or if Q is greater than 1, determine, by the centralized controller, a minimum-edge-weight node pair on each second path and an edge weight corresponding to each minimum-edge-weight node pair, determine a minimum-edge-weight node pair with a maximum edge weight from the minimum-edge-weight node pairs of all the second paths, determine, as a key relay path, a second path corresponding to the minimum-edge-weight node pair with the maximum edge weight, and determine, based on the key relay path, a key relay instruction corresponding to a service request.

Optionally, the processor is configured to: if Q is equal to 0, determine, by the centralized controller, S paths from all paths included in the first path set, to obtain a third path set, where S is an integer greater than or equal to 2, and any two paths included in the third path set do not have an overlapping edge; and if the centralized controller determines that the S paths meet a second condition corresponding to the quantum key consumption parameter, determine the S paths as the key relay paths, and determine, based on the key relay paths, a key relay instruction corresponding to a service request, where if the quantum key consumption parameter includes a total key consumption quantity K and service duration t, the second condition corresponding to the quantum key consumption parameter is: $P+\Sigma_{i=1}^{S}(P_i+w_i*t) \geq K$; or if the quantum key consumption parameter includes a service's key consumption speed V, the second condition corresponding to the quantum key consumption parameter is: $\Sigma_{i=1}^{S} w_i = V$, where a value range of i is [1, S], $P_i$ is a quantity of inventory quantum keys of a minimum-edge-weight node pair on an $i_{th}$ path, and $w_i$ is a quantum key generation speed of the minimum-edge-weight node pair on the $i_{th}$ path.

Optionally, the processor is configured to: if the centralized controller determines that any two paths in the first path set do not have an overlapping edge, determine that all the paths included in the first path set are the S paths; or if the centralized controller determines that at least two paths in the first path set have an overlapping edge, for each overlapping edge in the first path set, perform the following operations: determining T paths corresponding to the overlapping edge, and determining, as one of the S paths, a path corresponding to a minimum-edge-weight node pair with a maximum edge weight on the T paths, where T is an integer greater than or equal to 2.

Optionally, the processor is further configured to: determine, by the centralized controller, a quantum key consumption quantity $L_i$ corresponding to each key node corresponding to the $i_{th}$ path of the S paths, where if the quantum key consumption parameter includes a total key consumption quantity K and service duration t, $L_i=(P_i+w_i*t)-R$, R is a quantity of remaining keys of a minimum-edge-weight node pair on each path in the third path set, and $R=[\Sigma_{i=1}^{S}(P_i+w_i*t)-(K-P)]/S$.

Figure 4A:
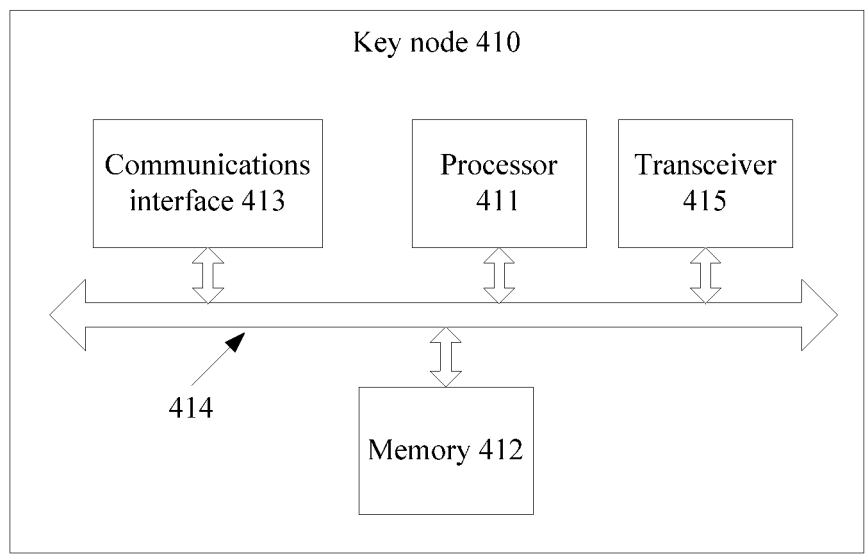
FIG. 4a is a schematic structural diagram of a key node according to an embodiment of this application.

Based on a same concept, FIG. 4a is an example of a schematic structural diagram of a key node according to an embodiment of this application. As shown in FIG. 4a, the key node is configured to perform the foregoing method procedure, and the key node 410 is applicable to a centralized management and control network. The centralized management and control network includes a centralized controller, N service nodes, and M key nodes. One service node is corresponding to one key node, both N and M are integers greater than or equal to 2, and the key node 410 includes a processor 411, a memory 412, and a transceiver 415. Optionally, the key node 410 further includes a bus 414 and a communications interface 413.

The memory is configured to store a program and an instruction, and may also store a quantum key.

The processor is configured to perform quantum key relay based on a key relay instruction delivered by the centralized controller.

The transceiver is configured to: report topology information of the key node to the centralized controller, and receive the key relay instruction delivered by the centralized controller.

The bus may be a Peripheral Component Interconnect (PCI) bus, an Extended Industry Standard Architecture (EISA) bus, or the like. The bus may be classified into an address bus, a data bus, a control bus, and the like. For ease of representation, the bus is represented by using only one bold line in FIG. 4, but it does not indicate that there is only one bus or one type of bus.

The memory may include a volatile memory, for example, a random-access memory (RAM); or the memory may include a non-volatile memory, for example, a flash memory, a hard disk drive (HDD), or a solid-state drive (SSD); or the memory may include a combination of the foregoing types of memories.

The communications interface may be a wired communications interface, a wireless communications interface, or a combination thereof. The wired communications interface may be, for example, an Ethernet interface. The Ethernet interface may be an optical interface, an electrical interface, or a combination thereof. The wireless communications interface may be a WLAN interface.

The processor may be a central processing unit (CPU), a network processor (NP), or a combination of a CPU and an NP. The processor may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

For related content of the key relay instruction, reference may be made to the foregoing descriptions. Details are not described herein again.

Optionally, the transceiver is configured to: periodically report the topology information of the key node to the centralized controller, where the topology information of the key node includes an identifier of each key node in the centralized management and control network, a status of a quantum link between each key node and one or more other key nodes, and an edge weight of any two adjacent key nodes; any two key nodes on each path from a source key node to a destination key node are corresponding to one edge weight, and a larger edge weight corresponding to two key nodes indicates a stronger quantum key providing capability of the two key nodes; and each path includes one minimum-edge-weight node pair, and the minimum-edge-weight node pair on each path is two key nodes with a minimum edge weight on the path.

Figure 4B:
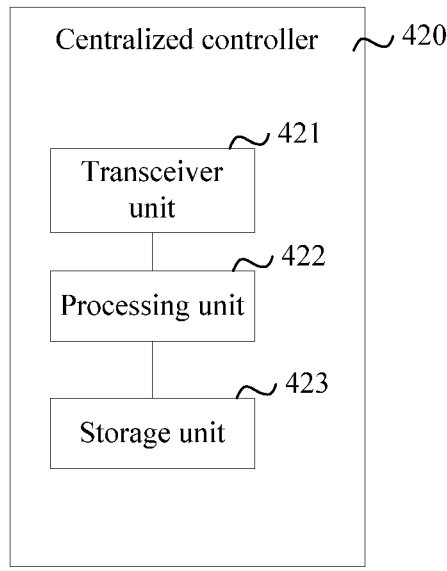
FIG. 4b is a schematic structural diagram of another centralized controller according to an embodiment of this application.

Based on the foregoing embodiments and a same concept, FIG. 4b is a schematic diagram of a centralized controller according to an embodiment of this application. As shown in FIG. 4b, the centralized controller 420 may be a network device, or may be a chip or a circuit, for example, a chip or a circuit that can be disposed on a network device. A communications device on the centralized controller 420 can implement steps performed by the centralized controller in the method corresponding to any one or more items shown in FIG. 3. The communications device on the centralized controller 420 may include a transceiver unit 421, a processing unit 422, and a storage unit 423.

The storage unit is configured to store related information in the foregoing method procedure, for example, topology information of the key nodes in the centralized management and control network.

The processing unit is configured to perform the following operations by invoking a program and an instruction that are stored in the memory: determining, based on each of the Z service requests obtained by the transceiver unit, an identifier of a source service node and an identifier of a destination service node that are corresponding to each service request, and a quantum key consumption parameter of the service request; and determining, based on the identifier of the source service node and the identifier of the destination service node that are corresponding to each of the Z service requests, the quantum key consumption parameter, and the topology information of the key nodes in the centralized management and control network, key relay instructions corresponding to G service requests, where the source service node is corresponding to a source key node, the destination service node is corresponding to a destination key node, Z is an integer greater than or equal to 1, and G is an integer less than or equal to Z and greater than or equal to 1.

The transceiver unit is configured to: obtain the Z service requests, and deliver the key relay instructions corresponding to the G service requests to key nodes corresponding to the key relay instructions, so that the key nodes perform quantum key relay based on the key relay instructions, to generate a shared quantum key between the source key node and the destination key node.

It may be understood that for a function of each unit in the centralized controller 420, reference may be made to corresponding method embodiments, and details are not described herein again.

It should be understood that division of the foregoing units is merely logical function division. In actual implementation, all or some of the units may be integrated into one physical entity, or may be physically separated. In this embodiment of this application, the transceiver unit 421 may be implemented by a transceiver 405, and the processing unit 422 may be implemented by a processor 401. As shown in FIG. 4, a centralized controller 400 may include the processor 401, the transceiver 405, and a memory 402. The memory 402 may be configured to store code used by the processor 401 to perform a solution, where the code may be a program/code pre-installed when the centralized controller is delivered from a factory.

Figure 5:
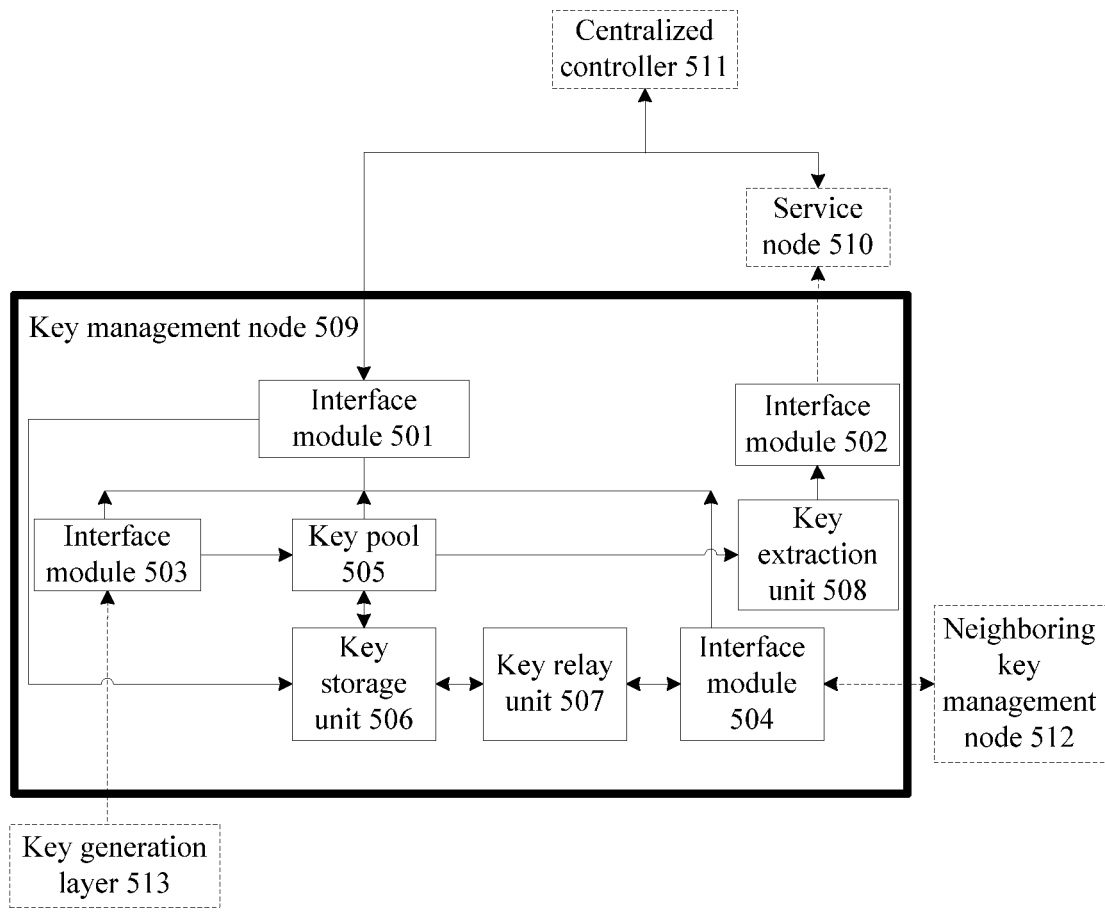
FIG. 5 is a schematic structural diagram of a possible key management node according to an embodiment of this application.

Based on a same concept, FIG. 5 is an example of a schematic structural diagram of a key node according to an embodiment of this application. As shown in FIG. 5, the key node is configured to perform the foregoing method procedure, and the key node is applicable to a centralized management and control network. The centralized management and control network includes a centralized controller, N service nodes, and M key nodes. One service node is corresponding to one key node, and both N and M are integers greater than or equal to 2. The key node is one of the M key nodes, and the key node includes a transceiver unit, a key pool 505, and a key relay unit 507. The transceiver unit includes various interface modules. For example, the transceiver unit shown in FIG. 5 may include an interface module 501, an interface module 502, an interface module 503, an interface module 504, and the like.

It should be understood that division of the foregoing units is merely logical function division. In actual implementation, all or some of the units may be integrated into one physical entity, or may be physically separated. In this embodiment of this application, the transceiver unit on the key node may be implemented by a transceiver 415, and the key relay unit 507 may be implemented by a processor 411. As shown in FIG. 4a, a key node 410 may include the processor 411, the transceiver 415, and a memory 412. The memory 412 may be configured to store code used by the processor 411 to perform a solution, where the code may be a program/code pre-installed when the key node 410 is delivered from a factory.

The key pool 505 is configured to store a quantum key.

The transceiver unit is configured to: report topology information of the key nodes to a centralized controller 511, and receive a key relay instruction delivered by the centralized controller 511.

The key relay unit 507 is configured to perform quantum key relay based on the key relay instruction delivered by the centralized controller 511.

The key relay instruction is used to indicate any one or more of the following content:

the key relay unit 507 determines, as a quantum key shared by the key node and a destination key node, a determined first target quantum key shared by the key node and a next-hop key node of the key node;

the key relay unit 507 determines a second target quantum key shared by the key node and a previous-hop key node of the key node, encrypts the second target quantum key by using a first encryption and decryption quantum key shared by the key node and a next-hop key node of the key node, and transmits the obtained encrypted second target quantum key to the next-hop key node of the key node;

the key relay unit 507 determines a second encryption and decryption quantum key shared by the key node and a previous-hop key node of the key node, decrypts an obtained encrypted third target quantum key by using the second encryption and decryption quantum key, encrypts the third target quantum key by using a third encryption and decryption quantum key shared by the key node and a next-hop key node of the key node, and transmits the obtained encrypted third target quantum key to the next-hop key node of the key node; and the key relay unit 507 determines a fourth encryption and decryption quantum key shared by the key node and a previous-hop key node of the key node, and decrypts an obtained encrypted fourth target quantum key by using the fourth encryption and decryption quantum key, to obtain a target quantum key.

Optionally, the key relay instruction is further used to indicate any one or more of the following content:

a key bit length of the first target quantum key, a key bit length of the second target quantum key, a key bit length of the third target quantum key, a key bit length of the fourth target quantum key, a key bit length of the first encryption and decryption quantum key, a key bit length of the second encryption and decryption quantum key, a key bit length of the third encryption and decryption quantum key, and a key bit length of the fourth encryption and decryption quantum key;

a key relay rate between the key node and the previous-hop key node of the key node;

a key relay rate between the key node and the next-hop key node of the key node;

key relay duration between the key node and the previous-hop key node of the key node;

key relay duration between the key node and the next-hop key node of the key node;

a key relay amount between the key node and the previous-hop key node of the key node; and a key relay amount between the key node and the next-hop key node of the key node.

Optionally, the transceiver unit is configured to: periodically report the topology information of the key node to the centralized controller, where the topology information of the key node includes an identifier of each key node in the centralized management and control network, a status of a quantum link between each key node and one or more other key nodes, and an edge weight of any two adjacent key nodes; any two adjacent key nodes on each path from a source key node to a destination key node are corresponding to one edge weight, and a larger edge weight corresponding to two key nodes indicates a stronger quantum key providing capability of the two key nodes; and each path includes one minimum-edge-weight node pair, and the minimum-edge-weight node pair on each path is two key nodes with a minimum edge weight on the path.

As shown in FIG. 5, optionally, the key node includes a key management node 509 and a key generation node included at a key generation layer 513. The key management node 509 on the key node may include the key pool 505 configured to store a quantum key, a key storage unit 506 configured to store a quantum key to the key pool 505, the key relay unit 507 configured to perform quantum key relay, and a key extraction unit 508 configured to extract a quantum key in the key pool 505 for encryption.

The key management node 509 is connected to the key generation layer 513 by using the interface module 503. Specifically, the key management node 509 is connected to the key generation node by using the interface module 503. The interface module 503 is configured to import a key generation status of an adjacent key node pair at the key generation layer 513 to the key management node 509. A shared key generated by the key generation layer 513 is stored to the key pool 505 by using the interface module 503.

The key management node 509 is connected to a neighboring key management node 512 by using the interface module 504. The interface module 504 is configured to exchange a link status of adjacent key management nodes between the adjacent key management nodes by using the interface module 504. If the neighboring key management node 512 is a relay node, a quantum key shared by the key management node 509 and the neighboring key management node 512 needs to be extracted from the key pool 505, to decrypt and encrypt a key that needs to be transmitted, and the key that needs to be transmitted is forwarded to a next key management node by using the interface module 504.

The centralized controller 511 is connected to the key management node 509 by using the interface module 501 of the key management node 509, and the centralized controller 511 is connected to a service node 510. The interface module 501 is configured to feed back a key generation speed of an adjacent key generation node pair (the key generation speed is imported to the key management node 509 by the key generation layer 513 by using the interface module 503), a quantity of inventory quantum keys of each key management node pair (the quantity of inventory quantum keys is imported from the key pool 505), and a link status of the neighboring key management node 512 (the neighboring key management node 512 is connected by using the interface module 504) to the centralized controller 511 by using the interface module 501. The centralized controller 511 generates a key relay path based on a service request and existing information, delivers the key relay path to the key storage unit 506 on the key management node 509 by using the interface module 501, and completes relay by using the key relay unit 507.

The key management node 509 is connected to the service node 510 by using the interface module 502. The interface module 502 is configured to: if the key management node 509 is the source key node or the destination key node, extract a key shared by the key management node 509 and the neighboring key management node 512 from the key pool 505 to decrypt a relayed quantum key, and then import the decrypted quantum key to the key pool 505. If a service needs to be encrypted or decrypted, the key management node 509 finds a corresponding quantum key from the key pool 505, imports the corresponding quantum key to a service node by using an interface module 502, and encrypts or decrypts the corresponding service.

In addition, the key generation layer 513 is responsible for secure point-to-point key generation, and ensures security of an entire QKD network. Entity functions of this layer usually include: first, comparing original quantum key bases, performing bit error estimation, and the like based on the QKD protocol, including various protocols such as BB84, E91, B92, and SARG04; second, error correction, that is, performing error correction for quantum key information obtained after base comparison; third, privacy amplification, that is, deleting information about a key learned by an eavesdropper (Eve); and fourth, identity authentication, that is, performing point-to-point identity authentication between adjacent nodes, to resist a man-in-the-middle attack.

Figure 6:
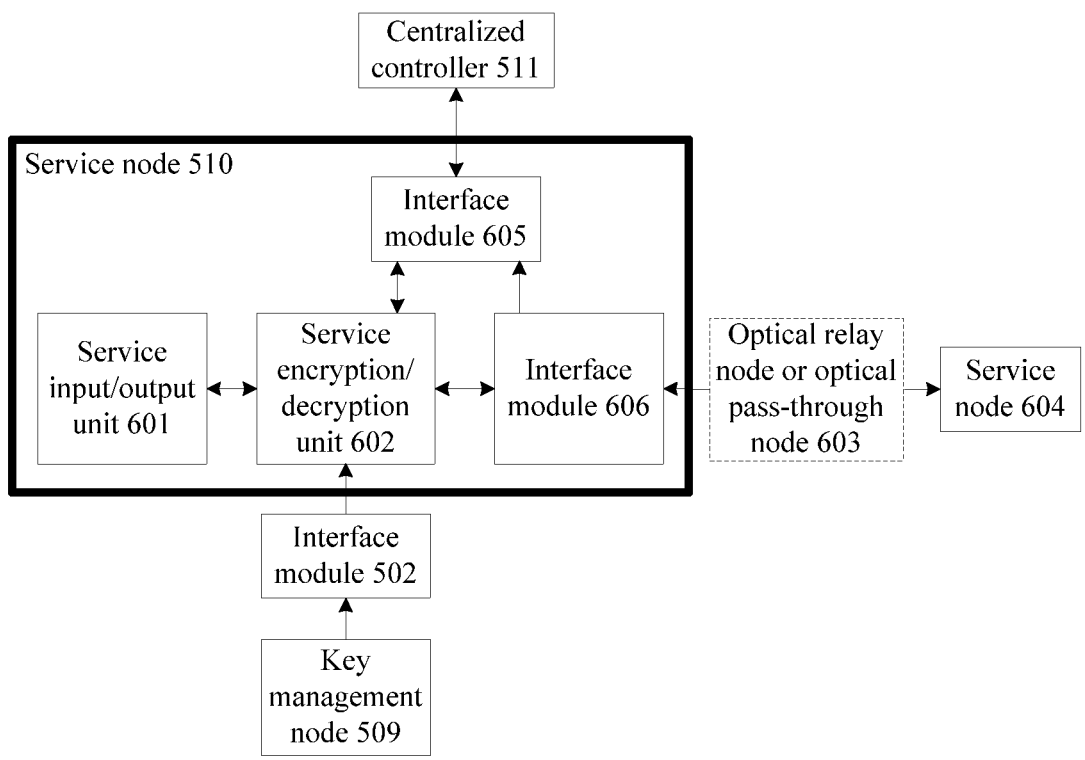
FIG. 6 is a schematic structural diagram of a possible service node according to an embodiment of this application.

FIG. 6 is an example of a schematic structural diagram of a possible service node according to an embodiment of this application. As shown in FIG. 6, a service node 510 may include a service input/output unit 601 configured to receive and send service requests, a service encryption/decryption unit 602 configured to encrypt or decrypt a service, and different interface modules, such as an interface module 606 and an interface module 605. Functions of the units and the interface modules are described as follows.

The service node 510 is connected to a centralized controller 511 by using the interface module 605. A link status of the service node 510 and a key requirement status of a service node pair are transmitted to the centralized controller 511 by using the interface module 605. Information exchange between the service node 510 and the centralized controller 511 is also implemented by the interface module 605.

The service node 510 is connected to a key management node 509 corresponding to the service node 510 by using an interface module 502. The interface module 502 is configured to: extract a quantum key at a key management layer, and apply the quantum key to the service node 510 to encrypt or decrypt a service.

The service node 510 is connected to a service node 604 by using the interface module 606 and an optical relay node or optical pass-through node 603. A link status of service nodes (such as a neighboring service node 604) is imported by the interface module 606. When the service node 510 is a source service node, the key management node 509 imports a quantum key used for encryption to the service node 510 by using the interface module 502, and after the service encryption/decryption unit 602 encrypts the service, the interface module 606 transmits the service to a next service node (which may be referred to as a relay service node). When the service node 510 is a destination service node, a quantum key used for decryption is imported from the key management node 509 to the service node 604 by the interface module 502, and the service encryption/decryption unit 602 decrypts the service and outputs the service.

In specific implementation, the centralized controller, the service node, and the key node that are provided in the embodiments of this application may be provided by different manufacturers. In the embodiments of this application, to implement interconnection between devices from various manufacturers, a possible interface solution is provided.

It should be noted that the unit division in the embodiments of this application is an example, is merely logical function division, and there may be another division manner in actual implementation. Functional units in the embodiments of this application may be integrated into one processing unit, or each of the units may exist alone physically, or at least two units are integrated into one unit. The integrated unit may be implemented in a form of hardware, or may be implemented in a form of a software functional unit.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with illustrative logical blocks (illustrative logical block) and steps (step) described in the embodiments disclosed in this disclosure, the functions may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division, and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or at least two units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method comprising:

obtaining, by a centralized controller of a centralized management and control network, Z service requests, each of which requests a service transmission of a service to be performed between two service nodes, wherein Z is an integer greater than or equal to 2, and wherein the centralized management and control network comprises N service nodes configured to communicate services with one another, and M key nodes configured to provide quantum keys to the N service nodes for communicating the services, both N and M being integers greater than or equal to 2;

for each of the Z service requests, determining, by the centralized controller based on each of the Z service requests, a source service node and a destination service node corresponding to each of the Z service requests, and a quantum key consumption requirement of each of the Z service requests including a quantum key consumption parameter of each of the Z service requests, wherein the quantum key consumption parameter includes a total key consumption quantity K and service duration t of the service, wherein the source service node is corresponding to a source key node in the M key nodes, and wherein the destination service node is corresponding to a destination key node in the M key nodes;

determining, by the centralized controller for each of the Z service requests, whether to perform a key relay operation for the service transmission of a service request, based on whether the quantum key consumption requirement of the service request is satisfiable by the centralized management and control network;

when determining to perform key relay operations for G service requests in the Z service requests, determining, by the centralized controller, key relay instructions corresponding to the G service requests, based on an identifier of the source service node and an identifier of the destination service node corresponding to each of the G service requests, the quantum key consumption parameter of each of the G service requests, and topology information of the M key nodes in the centralized management and control network, wherein G is an integer less than or equal to Z and greater than or equal to 1, wherein each key relay instruction specifies a path for relaying a quantum key between the source key node and the destination key node of a respective service request, wherein the topology information of the M key nodes in the centralized management and control network comprises: an identifier of each key node, a status of a quantum link between each key node and one or more other key nodes indicating whether the quantum link is operable, a quantity of inventory quantum keys between the source key node and the destination key node, a quantity of inventory quantum keys of a minimum-edge-weight node pair on the path, a quantum key generation speed of the minimum-edge-weight node pair on the path, and an edge weight of two adjacent key nodes on each path from the source key node to the destination key node of the respective service request, wherein a smaller edge weight of the two adjacent key nodes indicates a weaker quantum key providing capability of the two adjacent key nodes, wherein each path comprises one minimum-edge-weight node pair that comprises two key nodes with a minimum edge weight on a respective path, wherein the centralized controller determines G key relay instructions corresponding to the G service requests globally based on the topology information of the M key nodes in the centralized management and control network so that each key relay instruction of the G key relay instructions is globally optimal, and wherein the M key nodes are all key nodes in the centralized management and control network; and delivering, by the centralized controller, the key relay instructions corresponding to the G service requests to key nodes corresponding to the key relay instructions, so that the key nodes perform quantum key relay based on the key relay instructions, to generate respective shared quantum keys between respective source key node and the destination key node.

2. The method according to claim 1, wherein the edge weight of the two adjacent key nodes comprises any one of:

a sum of a quantity of inventory quantum keys shared by the two adjacent key nodes and a quantity of quantum keys that are generated and shared by the two adjacent key nodes in preset duration;

a quantity of inventory quantum keys shared by the two adjacent key nodes; and a generation speed of a quantum key shared by the two adjacent key nodes.

3. The method according to claim 2, wherein after obtaining, by the centralized controller, the Z service requests, and before determining the key relay instructions corresponding to the G service requests, the method further comprises:

for each of the Z service requests, performing following operations:

determining, by the centralized controller, each path from the source key node to the destination key node;

determining, by the centralized controller for each path, a current quantum key generation speed of the two adjacent key nodes on the respective path; and when the centralized controller determines that another service request has not been allocated on the respective path and there is no plan to allocate another service request on the respective path, determining the current quantum key generation speed as a quantum key generation speed of the two adjacent key nodes; or when the centralized controller determines that another service request has been allocated on the respective path or there is a plan to allocate another service request on the respective path, determining a quantum key consumption speed, corresponding to the another service request, of the two adjacent key nodes, and determining a difference between the current quantum key generation speed and the quantum key consumption speed corresponding to the another service request as a quantum key generation speed of the two adjacent key nodes.

4. The method according to claim 2, wherein after obtaining, by the centralized controller, the Z service requests, and before determining the key relay instructions corresponding to the G service requests, the method further comprises:

for each of the Z service requests, performing following operations:

determining, by the centralized controller, each path from the source key node to the destination key node;

determining, by the centralized controller for each path, a quantity of inventory quantum keys currently shared by the two adjacent key nodes on the respective path; and when the centralized controller determines that another service request has not been allocated on the respective path and there is no plan to allocate another service request on the respective path, determining the quantity of the inventory quantum keys currently shared by the two adjacent key nodes as a first quantity of inventory quantum keys shared by the two adjacent key nodes; or when the centralized controller determines that another service request has been allocated on the respective path or there is a plan to allocate another service request on the respective path, determining a quantum key consumption quantity, corresponding to the another service request, of the two adjacent key nodes, and determining a difference between the quantity of the inventory quantum keys currently shared by the two adjacent key nodes and the quantum key consumption quantity corresponding to the another service request as a first quantity of inventory quantum keys shared by the two adjacent key nodes.

5. The method according to claim 1, wherein after determining, by the centralized controller based on each of the Z service requests, the source service node and the destination service node corresponding to each of the Z service requests, and the quantum key consumption requirement of each of the Z service requests, and the determining the key relay instructions corresponding to the G service requests comprises:

for each of the Z service requests, performing following operations:

determining, by the centralized controller from the centralized management and control network based on the topology information of the M key nodes, paths from the source key node to the destination key node of the respective service request, to obtain a first path set; and determining, by the centralized controller from the first path set, Q second paths that meet a first condition corresponding to the quantum key consumption parameter, wherein Q is an integer greater than or equal to 0, and wherein the first condition corresponding to the quantum key consumption parameter is: $P+P_m+w_m*t \leq K$, wherein P is the quantity of inventory quantum keys between the source key node and the destination key node, $P_m$ is the quantity of inventory quantum keys of the minimum-edge-weight node pair on the path, and $w_m$ is the quantum key generation speed of the minimum-edge-weight node pair on the path.

6. The method according to claim 5, wherein determining, by the centralized controller, the key relay instructions corresponding to the G service requests comprises:

when Q is equal to 1, determining, by the centralized controller, a second path as a key relay path, and determining, based on the key relay path, a key relay instruction corresponding to a service request; or when Q is greater than 1, determining, by the centralized controller, a minimum-edge-weight node pair on each second path and an edge weight of the minimum-edge-weight node pair, determining a minimum-edge-weight node pair with a maximum edge weight from minimum-edge-weight node pairs of all the second paths, determining, as a key relay path, a second path corresponding to the minimum-edge-weight node pair with the maximum edge weight, and determining, based on the key relay path, a key relay instruction corresponding to a service request.

7. The method according to claim 5, wherein determining, by the centralized controller, the key relay instructions corresponding to the G service requests comprises:

when Q is equal to 0, determining, by the centralized controller, S paths from the first path set, to obtain a third path set, wherein S is an integer greater than or equal to 2, and any two paths comprised in the third path set do not have an overlapping edge; and when the centralized controller determines that the S paths meet a second condition corresponding to the quantum key consumption parameter, determining the S paths as key relay paths, and determining, based on the key relay paths, a key relay instruction corresponding to a service request, wherein when the quantum key consumption parameter comprises a total key consumption quantity K and service duration t, the second condition corresponding to the quantum key consumption parameter is $P+\Sigma_{i=1}^{S}(P_i+w_i*t) \geq K$, or when the quantum key consumption parameter comprises the service's key consumption speed V, the second condition corresponding to the quantum key consumption parameter is $\Sigma_{i=1}^{S} w_i \geq V$, wherein a value range of i is [1, S], $P_i$ is a quantity of inventory quantum keys of a minimum-edge-weight node pair on an $i^{th}$ path, and $w_i$ is a quantum key generation speed of the minimum-edge-weight node pair on the $i^{th}$ path.

8. The method according to claim 7, wherein determining, by the centralized controller, the S paths from the first path set, to obtain the third path set comprises:

when the centralized controller determines that any two paths in the first path set do not have an overlapping edge, determining that all the paths comprised in the first path set are the S paths; or when the centralized controller determines that at least two paths in the first path set have an overlapping edge, determining, for each overlapping edge in the first path set, T paths corresponding to a respective overlapping edge, and using, as one of the S paths, a path corresponding to a minimum-edge-weight node pair with a maximum edge weight in the T paths, wherein T is an integer greater than or equal to 2.

9. The method according to claim 7, wherein after determining, by the centralized controller, the S paths as the key relay paths, the method further comprises:

determining, by the centralized controller, a quantum key consumption quantity $L_i$ corresponding to each key node on an $i^{th}$ path of the S paths, wherein, when the quantum key consumption parameter comprises a total key consumption quantity K and service duration t, $L_i=(P_i+w_i*t)-R$, wherein R is a quantity of remaining keys of a minimum-edge-weight node pair on each path in the third path set, and $R=[\Sigma_{i=1}^{S}(P_i+w_i*t)-(K-P)]/S$.

10. A method comprising:

reporting, by a key node of M key nodes in a centralized management and control network, topology information of the key node to a centralized controller of the centralized management and control network, the centralized management and control network comprising N service nodes configured to communicate services with one another, and each of the N service nodes corresponding to one of the M key nodes, wherein the M key nodes are configured to provide quantum keys to the N service nodes, and both N and M are integers greater than or equal to 2; wherein the topology information of the key node comprises an identifier of each key node in the centralized management and control network, a status of a quantum link between each key node and one or more other key nodes indicating whether the quantum link is operable, a quantity of inventory quantum keys between a source key node and a destination key node, a quantity of inventory quantum keys of a minimum-edge-weight node pair on a path, a quantum key generation speed of the minimum-edge-weight node pair on the path, and an edge weight of two adjacent key nodes on each path from the source key node to the destination key node; a larger edge weight corresponding to two key nodes indicates a stronger quantum key providing capability of the two key nodes; and each path comprises one minimum-edge-weight node pair comprising two key nodes with a minimum edge weight on a respective path;

receiving, by the key node, a key relay instruction delivered by the centralized controller, wherein the key relay instruction is determined based on an identifier of a source service node and an identifier of a destination service node that are corresponding to each of Z service requests, a quantum key consumption requirement of each of the Z service requests including a quantum key consumption parameter of each of the Z service requests, and topology information of the M key nodes in the centralized management and control network, wherein the quantum key consumption parameter includes a total key consumption quantity K and service duration t of a service, Z being an integer greater than or equal to 2, wherein the centralized controller determines G key relay instructions corresponding to G service requests globally based on the topology information of the M key nodes in the centralized management and control network so that each key relay instruction of the G key relay instructions is globally optimal, and wherein the M key nodes are all key nodes in the centralized management and control network; and performing, by the key node, quantum key relay based on the key relay instruction delivered by the centralized controller; and the key node comprises any one of a first key node, a second key node, a third key node and a fourth key node, wherein the key relay instruction indicates any one or more of:

the first key node determines, as a quantum key shared by the first key node and the destination key node, a determined first target quantum key shared by the first key node and a next-hop key node of the first key node;

the second key node determines a second target quantum key shared by the second key node and a previous-hop key node of the second key node, encrypts the second target quantum key by using a first encryption and decryption quantum key shared by the second key node and a next-hop key node of the second key node, and transmits the encrypted second target quantum key to the next-hop key node of the second key node;

the third key node determines a second encryption and decryption quantum key shared by the third key node and a previous-hop key node of the third key node, decrypts an obtained encrypted third target quantum key by using the second encryption and decryption quantum key, encrypts the third target quantum key by using a third encryption and decryption quantum key shared by the third key node and a next-hop key node of the third key node, and transmits the obtained encrypted third target quantum key to the next-hop key node of the third key node; and the fourth key node determines a fourth encryption and decryption quantum key shared by the fourth key node and a previous-hop key node of the fourth key node, and decrypts an obtained encrypted fourth target quantum key by using the fourth encryption and decryption quantum key, to obtain a target quantum key.

11. The method according to claim 10, wherein the key relay instruction further indicates any one or more of:

a key bit length of the determined first target quantum key, a key bit length of the second target quantum key, a key bit length of the third target quantum key, a key bit length of the fourth target quantum key, a key bit length of the first encryption and decryption quantum key, a key bit length of the second encryption and decryption quantum key, a key bit length of the third encryption and decryption quantum key, and a key bit length of the fourth encryption and decryption quantum key;

a key relay rate between the key node and the previous-hop key node of the key node;

a key relay rate between the key node and the next-hop key node of the key node;

key relay duration between the key node and the previous-hop key node of the key node;

key relay duration between the key node and the next-hop key node of the key node;

a key relay amount between the key node and the previous-hop key node of the key node; and a key relay amount between the key node and the next-hop key node of the key node.

12. A centralized controller of a centralized management and control network comprising a memory, a processor, and a transceiver, wherein the memory is configured to store a program and an instruction;

the processor is configured to perform following operations by invoking the program and the instruction that are stored in the memory, the operations including:

for each of Z service requests, determining, based on each of the Z service requests obtained by the transceiver, a source service node and a destination service node corresponding to each of the Z service requests, and a quantum key consumption requirement of each of the Z service requests including a quantum key consumption parameter of each of the Z service requests, wherein the quantum key consumption parameter includes a total key consumption quantity K and service duration t of a service, wherein the centralized management and control network comprises N service nodes configured to communicate services with one another, and wherein M key nodes configured to provide quantum keys to the N service nodes for communicating the services, and both N and M are integers greater than or equal to 2, each of the Z service requests requesting a service transmission of the service to be performed between two service nodes, Z being an integer greater than or equal to 2;

determining, for each of the Z service requests, whether to perform a key relay operation for the service transmission of a service request, based on whether the quantum key consumption requirement of the service request is satisfiable by the centralized management and control network; and when determining to perform key relay operations for G service requests in the Z service requests, determining key relay instructions corresponding to the G service requests, based on the source service node and the destination service node corresponding to each of the G service requests, the quantum key consumption parameter of each of the G service requests, and topology information of the M key nodes in the centralized management and control network, wherein the source service node is corresponding to a source key node in the M key nodes, the destination service node is corresponding to a destination key node in the M key nodes, and G is an integer less than or equal to Z and greater than or equal to 1, and wherein each key relay instruction specifies a path for relaying a quantum key between the source key node and the destination key node of a respective service request; wherein the topology information of the M key nodes in the centralized management and control network comprises: an identifier of each key node, a status of a quantum link between each key node and one or more other key nodes indicating whether the quantum link is operable, a quantity of inventory quantum keys between the source key node and the destination key node, a quantity of inventory quantum keys of a minimum-edge-weight node pair on the path, a quantum key generation speed of the minimum-edge-weight node pair on the path, and an edge weight of two adjacent key nodes; on each path from the source key node to the destination key node of the respective service request, wherein a smaller edge weight of the two adjacent key nodes indicates a weaker quantum key providing capability of the two adjacent key nodes; and each path comprises one minimum-edge-weight node pair comprising two key nodes with a minimum edge weight on a respective path, wherein the centralized controller determines G key relay instructions corresponding to the G service requests globally based on the topology information of the M key nodes in the centralized management and control network so that each key relay instruction of the G key relay instructions is globally optimal, and wherein the M key nodes are all key nodes in the centralized management and control network; and the transceiver is configured to: obtain the Z service requests, and deliver the key relay instructions corresponding to the G service requests to key nodes corresponding to the key relay instructions, so that the key nodes perform quantum key relay based on the key relay instructions, to generate respective shared quantum keys between respective source key nodes and destination key node.

13. The centralized controller according to claim 12, wherein the edge weight of the two adjacent key nodes comprises any one of:
  a sum of a quantity of inventory quantum keys shared by the two adjacent key nodes and a quantity of quantum keys that are generated and shared by the two adjacent key nodes in preset duration;
  a quantity of inventory quantum keys shared by the two adjacent key nodes; and
  a generation speed of a quantum key shared by the two adjacent key nodes.

14. The centralized controller according to claim 13, wherein the processor is further configured to, for each of the Z service requests, perform following operations:
  determining, by the processor, each path from the source key node to the destination key node;
  determining, by the processor for each path, a current quantum key generation speed of the two adjacent key nodes on the respective path; and when the processor determines that another service request has not been allocated on the respective path and there is no plan to allocate another service request on the respective path, determining the current quantum key generation speed as a quantum key generation speed of the two adjacent key nodes; or when the processor determines that another service request has been allocated on the respective path or there is a plan to allocate another service request on the respective path, determining a quantum key consumption speed, corresponding to the another service request, of the two adjacent key nodes, and determining a difference between the current quantum key generation speed and the quantum key consumption speed corresponding to the another service request as a quantum key generation speed of the two adjacent key nodes.

15. The centralized controller according to claim 13, wherein the processor is further configured to, for each of the Z service requests, perform following operations:
  determining, by the processor, each path from the source key node to the destination key node;
  determining, by the processor for each path, a quantity of inventory quantum keys currently shared by the two adjacent key nodes on the respective path; and
  when the processor determines that another service request has not been allocated on the respective path and there is no plan to allocate another service request on the respective path, determining the quantity of the inventory quantum keys currently shared by the two adjacent key nodes as a first quantity of inventory quantum keys shared by the two adjacent key nodes; or when the processor determines that another service request has been allocated on the respective path or there is a plan to allocate another service request on the respective path, determining a quantum key consumption quantity, corresponding to the another service request, of the two adjacent key nodes, and determining a difference between the quantity of the inventory quantum keys currently shared by the two adjacent key nodes and the quantum key consumption quantity corresponding to the another service request as a first quantity of inventory quantum keys shared by the two adjacent key nodes.

16. The centralized controller according to claim 12, wherein the processor is further configured to, for each of the Z service requests, perform following operations:
  determining, by the processor from the centralized management and control network based on the topology information of the M key nodes, paths from the source key node to the destination key node of the respective service request, to obtain a first path set; and
  determining, by the processor from the first path set, Q second paths that meet a first condition corresponding to the quantum key consumption parameter, wherein Q is an integer greater than or equal to 0, and
  wherein the first condition corresponding to the quantum key consumption parameter is: $P+P_m+w_m*t \geq K$,
  wherein P is the quantity of inventory quantum keys between the source key node and the destination key node, $P_m$ is the quantity of inventory quantum keys of the minimum-edge-weight node pair on the path, and win is the quantum key generation speed of the minimum-edge-weight node pair on the path.

17. The centralized controller according to claim 16, wherein the processor is further configured to:
  when Q is equal to 1, determine, by the processor, a second path as a key relay path, and determine, based on the key relay path, a key relay instruction corresponding to a service request; or when Q is greater than 1, determine, by the processor, a minimum-edge-weight node pair on each second path and an edge weight of the minimum-edge-weight node pair, determine a minimum-edge-weight node pair with a maximum edge weight from minimum-edge-weight node pairs of all the second paths, determine, as a key relay path, a second path corresponding to the minimum-edge-weight node pair with the maximum edge weight, and determine, based on the key relay path, a key relay instruction corresponding to a service request.

18. The centralized controller according to claim 16, wherein the processor is configured to:

when Q is equal to 0, determine, by the processor, S paths from the first path set, to obtain a third path set, wherein S is an integer greater than or equal to 2, and any two paths comprised in the third path set do not have an overlapping edge; and when the processor determines that the S paths meet a second condition corresponding to the quantum key consumption parameter, determine the S paths as key relay paths, and determine, based on the key relay paths, a key relay instruction corresponding to a service request;

wherein when the quantum key consumption parameter comprises a total key consumption quantity K and service duration t, the second condition corresponding to the quantum key consumption parameter is: $P+\Sigma_{i=1}^{S}(P_i+w_i*t) \geq K$; or wherein when the quantum key consumption parameter comprises the service's key consumption speed V, the second condition corresponding to the quantum key consumption parameter is: $\Sigma_{i=1}^{S} w_i \geq V$, wherein a value range of i is [1, S], $P_i$ is a quantity of inventory quantum keys of a minimum-edge-weight node pair on an $i^{th}$ path, and $w_i$ is a quantum key generation speed of the minimum-edge-weight node pair on the $i^{th}$ path.

19. The centralized controller according to claim 18, wherein the processor is configured to:

when the processor determines that any two paths in the first path set do not have an overlapping edge, determine that all the paths comprised in the first path set are the S paths; or when the processor determines that at least two paths in the first path set have an overlapping edge, determine, for each overlapping edge in the first path set, T paths corresponding to a respective overlapping edge, and use, as one of the S paths, a path corresponding to a minimum-edge-weight node pair with a maximum edge weight in the T paths, wherein T is an integer greater than or equal to 2.

20. The centralized controller according to claim 18, wherein the processor is further configured to:

determine, by the processor, a quantum key consumption quantity $L_i$, corresponding to each key node on an $i^{th}$ path of the S paths, wherein when the quantum key consumption parameter comprises a total key consumption quantity K and service duration t, $L_i=(P_i+w_i*t)-R$, wherein R is a quantity of remaining keys of a minimum-edge-weight node pair on each path in the third path set, and $R=[\Sigma_{i=1}^{S}(P_i+w_i*t)-(K-P)]/S$.

21. A key node of a centralized management and control network, comprising a transceiver, a key pool, and a key relay processor, wherein the centralized management and control network comprises a centralized controller, N service nodes configured to communicate services with one another, and M key nodes configured to provide quantum keys to the N service nodes, wherein each of the N service nodes corresponds to one of the M key nodes, and both N and M are integers greater than or equal to 2;

the key pool is configured to store a quantum key;

the transceiver is configured to:

report topology information of the key node to the centralized controller, and receive a key relay instruction delivered by the centralized controller, wherein the topology information of the key node comprises an identifier of each key node in the centralized management and control network, a status of a quantum link between each key node and one or more other key nodes indicating whether the quantum link is operable, a quantity of inventory quantum keys between a source key node and a destination key node, a quantity of inventory quantum keys of a minimum-edge-weight node pair on a path, a quantum key generation speed of the minimum-edge-weight node pair on the path, and an edge weight of two adjacent key nodes on each path from the source key node to the destination key node, a larger edge weight corresponding to two key nodes indicates a stronger quantum key providing capability of the two key nodes, and wherein each path comprises one minimum-edge-weight node pair comprising two key nodes with a minimum edge weight on a respective path; and the key relay processor is configured to perform quantum key relay based on the key relay instruction delivered by the centralized controller, wherein the key relay instruction is determined based on an identifier of a source service node and an identifier of a destination service node that are corresponding to each of Z service requests, a quantum key consumption requirement of each of the Z service requests including a quantum key consumption parameter required by each of the Z service requests, and topology information of the M key nodes in the centralized management and control network, wherein the quantum key consumption parameter includes a total key consumption quantity K and service duration t of a service, Z being an integer greater than or equal to 2, wherein the centralized controller determines G key relay instructions corresponding to G service requests globally based on the topology information of the M key nodes in the centralized management and control network so that each key relay instruction of the G key relay instructions is globally optimal, and wherein the M key nodes are all key nodes in the centralized management and control network;

the key relay processor comprises any one of a first key relay processor, a second key relay processor, a third key relay processor and a fourth key relay processor, and the key node comprises any one of a first key node, a second key node, a third key node and a fourth key node, wherein the key relay instruction indicates any one or more of:

the first key relay processor determines, as a quantum key shared by the first key node and the destination key node, a determined first target quantum key shared by the first key node and a next-hop key node of the first key node;

the second key relay processor determines a second target quantum key shared by the second key node and a previous-hop key node of the second key node, encrypts the second target quantum key by using a first encryption and decryption quantum key shared by the second key node and a next-hop key node of the second key node, and transmits the encrypted second target quantum key to the next-hop key node of the second key node;

the third key relay processor determines a second encryption and decryption quantum key shared by the third key node and a previous-hop key node of the third key node, decrypts an obtained encrypted third target quantum key by using the second encryption and decryption quantum key, encrypts the third target quantum key by using a third encryption and decryption quantum key shared by the third key node and a next-hop key node of the third key node, and transmits the obtained encrypted third target quantum key to the next-hop key node of the third key node; and the fourth key relay processor determines a fourth encryption and decryption quantum key shared by the fourth key node and a previous-hop key node of the fourth key node, and decrypts an obtained encrypted fourth target quantum key by using the fourth encryption and decryption quantum key, to obtain a target quantum key.

22. The key node according to claim 21, wherein the key relay instruction further indicates any one or more of:
a key bit length of the determined first target quantum key, a key bit length of the second target quantum key, a key bit length of the third target quantum key, a key bit length of the fourth target quantum key, a key bit length of the first encryption and decryption quantum key, a key bit length of the second encryption and decryption quantum key, a key bit length of the third encryption and decryption quantum key, and a key bit length of the fourth encryption and decryption quantum key;
a key relay rate between the key node and the previous-hop key node of the key node;
a key relay rate between the key node and the next-hop key node of the key node;
key relay duration between the key node and the previous-hop key node of the key node;
key relay duration between the key node and the next-hop key node of the key node;
a key relay amount between the key node and the previous-hop key node of the key node; and
a key relay amount between the key node and the next-hop key node of the key node.

23. A non-transitory computer readable medium, wherein the non-transitory computer readable medium stores a computer executable instruction, and when the computer executable instruction is invoked by a computer, the computer performs a method comprising:
reporting, by a key node of M key nodes in a centralized management and control network, topology information of the key node to a centralized controller of the centralized management and control network, the centralized management and control network comprising N service nodes configured to communicate services with one another, and each of the N service nodes corresponding to one of the M key nodes, wherein the M key nodes are configured to provide quantum keys to the N service nodes, and both N and M are integers greater than or equal to 2; wherein the topology information of the key node comprises an identifier of each key node in the centralized management and control network, a status of a quantum link between each key node and one or more other key nodes indicating whether the quantum link is operable, and an edge weight of two adjacent key nodes on each path from a source key node to a destination key node, a quantity of inventory quantum keys between the source key node and the destination key node, a quantity of inventory quantum keys of a minimum-edge-weight node pair on a path, a quantum key generation speed of the minimum-edge-weight node pair on the path, and a larger edge weight corresponding to two key nodes indicates a stronger quantum key providing capability of the two key nodes, and wherein each path comprises one minimum-edge-weight node pair comprising two key nodes with a minimum edge weight on the path;

receiving, by the key node, a key relay instruction delivered by the centralized controller, wherein the centralized controller determines G key relay instructions corresponding to G service requests globally based on the topology information of the M key nodes in the centralized management and control network so that each key relay instruction of the G key relay instructions is globally optimal, and wherein the M key nodes are all key nodes in the centralized management and control network; and performing, by the key node, quantum key relay based on the key relay instruction delivered by the centralized controller, wherein the key relay instruction is determined based on an identifier of a source service node and an identifier of a destination service node that are corresponding to each of Z service requests, a quantum key consumption requirement of each of the Z service requests including a quantum key consumption parameter of each of the Z service requests, and topology information of the M key nodes in the centralized management and control network, wherein the quantum key consumption parameter includes a total key consumption quantity K and service duration t of a service, Z is an integer greater than or equal to 2, the key node comprises any one of a first key node, a second key node, a third key node and a fourth key node, wherein the key relay instruction indicates any one or more of:

the first key node determines, as a quantum key shared by the first key node and the destination key node, a determined first target quantum key shared by the first key node and a next-hop key node of the first key node;

the second key node determines a second target quantum key shared by the second key node and a previous-hop key node of the second key node, encrypts the second target quantum key by using a first encryption and decryption quantum key shared by the second key node and a next-hop key node of the second key node, and transmits the encrypted second target quantum key to the next-hop key node of the second key node;

the third key node determines a second encryption and decryption quantum key shared by the third key node and a previous-hop key node of the third key node, decrypts an obtained encrypted third target quantum key by using the second encryption and decryption quantum key, encrypts the third target quantum key by using a third encryption and decryption quantum key shared by the third key node and a next-hop key node of the third key node, and transmits the obtained encrypted third target quantum key to the next-hop key node of the third key node; and the fourth key node determines a fourth encryption and decryption quantum key shared by the fourth key node and a previous-hop key node of the fourth key node, and decrypts an obtained encrypted fourth target quantum key by using the fourth encryption and decryption quantum key, to obtain a target quantum key.

24. The non-transitory computer readable medium according to claim 23, wherein the key relay instruction further indicates any one or more of:
- a key bit length of the determined first target quantum key, a key bit length of the second target quantum key, a key bit length of the third target quantum key, a key bit length of the fourth target quantum key, a key bit length of the first encryption and decryption quantum key, a key bit length of the second encryption and decryption quantum key, a key bit length of the third encryption and decryption quantum key, and a key bit length of the fourth encryption and decryption quantum key;
- a key relay rate between the key node and the previous-hop key node of the key node;
- a key relay rate between the key node and the next-hop key node of the key node;
- key relay duration between the key node and the previous-hop key node of the key node;
- key relay duration between the key node and the next-hop key node of the key node;
- a key relay amount between the key node and the previous-hop key node of the key node; and
- a key relay amount between the key node and the next-hop key node of the key node.

25. The method according to claim 1, wherein the centralized controller determines Z quantum key consumption parameters corresponding to the Z service requests, the Z quantum key consumption parameters including a first quantum key consumption parameter of a first service request of the Z service requests, the Z quantum key consumption parameters further including a second quantum key consumption parameter of a second service request of the Z service requests.

26. The method according to claim 25, wherein the first quantum key consumption parameter of the first service request includes at least one of a first duration of a first service corresponding to the first service request or a first key consumption speed of the first service, and wherein the second quantum key consumption parameter of the second service request includes at least one of a second duration of a second service corresponding to the second service request or a second key consumption speed of the second service.

27. The method according to claim 1, wherein the each key relay instruction of the G key relay instructions does not conflict with one another.

28. The method according to claim 1, wherein the Z service requests include two service requests requesting service transmissions to be performed between a same source service node and a same destination service node.

* * * * *

UNITED STATES PATENT AND TRADEMARK OFFICE
CERTIFICATE OF CORRECTION

PATENT NO. : 12,028,450 B2
APPLICATION NO. : 16/402525
DATED : July 2, 2024
INVENTOR(S) : Su et al.

It is certified that error appears in the above-identified patent and that said Letters Patent is hereby corrected as shown below:

In the Claims

In Column 40, in Claim 1, Line 19, delete "between" and insert -- between a --.

In Column 46, in Claim 16, Line 62, delete "win" and insert -- $w_m$ --.

In Column 47, in Claim 20, Line 58, delete "$L_i$," and insert -- $L_i$ --.

Signed and Sealed this
Sixth Day of August, 2024

Katherine Kelly Vidal
*Director of the United States Patent and Trademark Office*